United States Patent
Kim et al.

(10) Patent No.: US 11,310,856 B2
(45) Date of Patent: Apr. 19, 2022

(54) METHOD AND APPARATUS FOR PERFORMING DUAL CONNECTIVITY IN HETEROGENEOUS NETWORK

(71) Applicant: Samsung Electronics Co., Ltd, Suwon-si (KR)

(72) Inventors: Taesung Kim, Suwon-si (KR); Janghwan Kim, Suwon-si (KR); Seungbo Yoo, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 302 days.

(21) Appl. No.: 16/552,961

(22) Filed: Aug. 27, 2019

(65) Prior Publication Data
US 2020/0068639 A1  Feb. 27, 2020

(30) Foreign Application Priority Data
Aug. 27, 2018 (KR) .................. 10-2018-0100489

(51) Int. Cl.
*H04W 76/16* (2018.01)
*H04W 92/20* (2009.01)

(52) U.S. Cl.
CPC ............ *H04W 76/16* (2018.02); *H04W 92/20* (2013.01)

(58) Field of Classification Search
CPC ..... H04W 76/16; H04W 92/20; H04W 72/04; H04W 88/08
See application file for complete search history.

(56) References Cited

U.S. PATENT DOCUMENTS

| 2011/0080890 | A1  | 4/2011 | Cai et al. |
| 2016/0044639 | A1* | 2/2016 | Yi ........................ H04L 47/624 370/329 |

(Continued)

FOREIGN PATENT DOCUMENTS

KR  10-2018-0091050 A  8/2018

OTHER PUBLICATIONS

3GPP TSG-RAN WG3#NR Adhoc 1807, R3-183785, PDCP Reset indication, Source: Nokia, Nokia Shanghai Bell, Montreal, Canada, Jul. 2-6, 2018 (Year: 2018).*

(Continued)

*Primary Examiner* — Edan Orgad
*Assistant Examiner* — Malick A Sohrab

(57) ABSTRACT

The present disclosure relates to a communication method and system for converging a 4th-Generation (4G) communication system or a 5th-Generation (5G) communication system for supporting higher data rates beyond the 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method of a central unit-control plane (CU-CP) included in a secondary node (SN) (or secondary gNB (SgNB)) in a wireless communication system supporting evolved universal terrestrial radio access and new radio dual connectivity (EN-DC) includes receiving, from a master node (MN) (or master eNB (MeNB)), a first message for requesting the SgNB to allocate a radio resource for a bearer, and transmitting a second message, including indication information indicating whether a packet data convergence protocol (PDCP) version of the bearer has been changed, to (Continued)

the CU-UP included in the SgNB. The indication information is generated based on the first message.

20 Claims, 21 Drawing Sheets

(56) References Cited

U.S. PATENT DOCUMENTS

| | | | |
|---|---|---|---|
| 2018/0352468 A1* | 12/2018 | Futaki | H04L 29/04 |
| 2019/0313294 A1* | 10/2019 | Balasubramanian | H04W 12/35 |
| 2019/0342800 A1* | 11/2019 | Sirotkin | H04B 17/318 |
| 2020/0053815 A1* | 2/2020 | Teyeb | H04W 76/16 |
| 2020/0178208 A1* | 6/2020 | Kim | H04W 76/15 |
| 2020/0245393 A1* | 7/2020 | Teyeb | H04W 76/25 |
| 2021/0235534 A1* | 7/2021 | Fiorani | H04W 76/19 |

OTHER PUBLICATIONS

3GPP TSG-RAN3 Meeting #AH-1807, R3-184385, NR_newRAT-Core, NR_CPUP_Split, Source: Rapporteur (NEC), Montreal, Canada, Jul. 2-6, 2018 (Year: 2018).*

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.2.0 (Jun. 2018), 55 pages.

Samsung, "Unifying Bearer Types and Related Issues", 3GPP TSG-RAN WG2 Ad-hoc NR#2, Jun. 27-29, 2017, R2-1707376, 2 pages.

Ericsson et al., "UP version handling", 3GPP TSG RAN WG3 Meeting AH 1807, Jul. 2-6, 2018, R3-184054, 3 pages.

CATT, "NR PDCP Reconfiguration for SRB1", 3GPP TSG-RAN WG2#101, Feb. 26-Mar. 2, 2018, R2-1801922, 3 pages.

Supplementary European Search Report dated May 31, 2021 in connection with European Patent Application No. 19 85 3392, 8 pages.

Nokia et al., "(TP for NR BL CR for TS 38.463) PDCP Reset indication", 3GPP TSG-RAN WG3#NR Adhoc 1807, Jul. 2-6, 2018, R3-183785, 49 pages.

Rapporteur (NEC), Baseline CR for TS 38.401 covering agreements of RAN3#AH1807, 3GPP TSG-RAN3 Meeting #AH-1807, Jul. 2-6, 2018, R3-184385, 35 pages.

Ericsson et al., "E1 support for UP version handling", 3GPP TSG RAN WG3 Meeting AH 1807, Jul. 2-6, 2018, R3-184056, 13 pages.

International Search Report dated Nov. 29, 2019 in connection with International Patent Application No. PCT/KR2019/010907, 3 pages.

Written Opinion of the International Searching Authority dated Nov. 29, 2019 in connection with International Patent Application No. PCT/KR2019/010907, 6 pages.

* cited by examiner

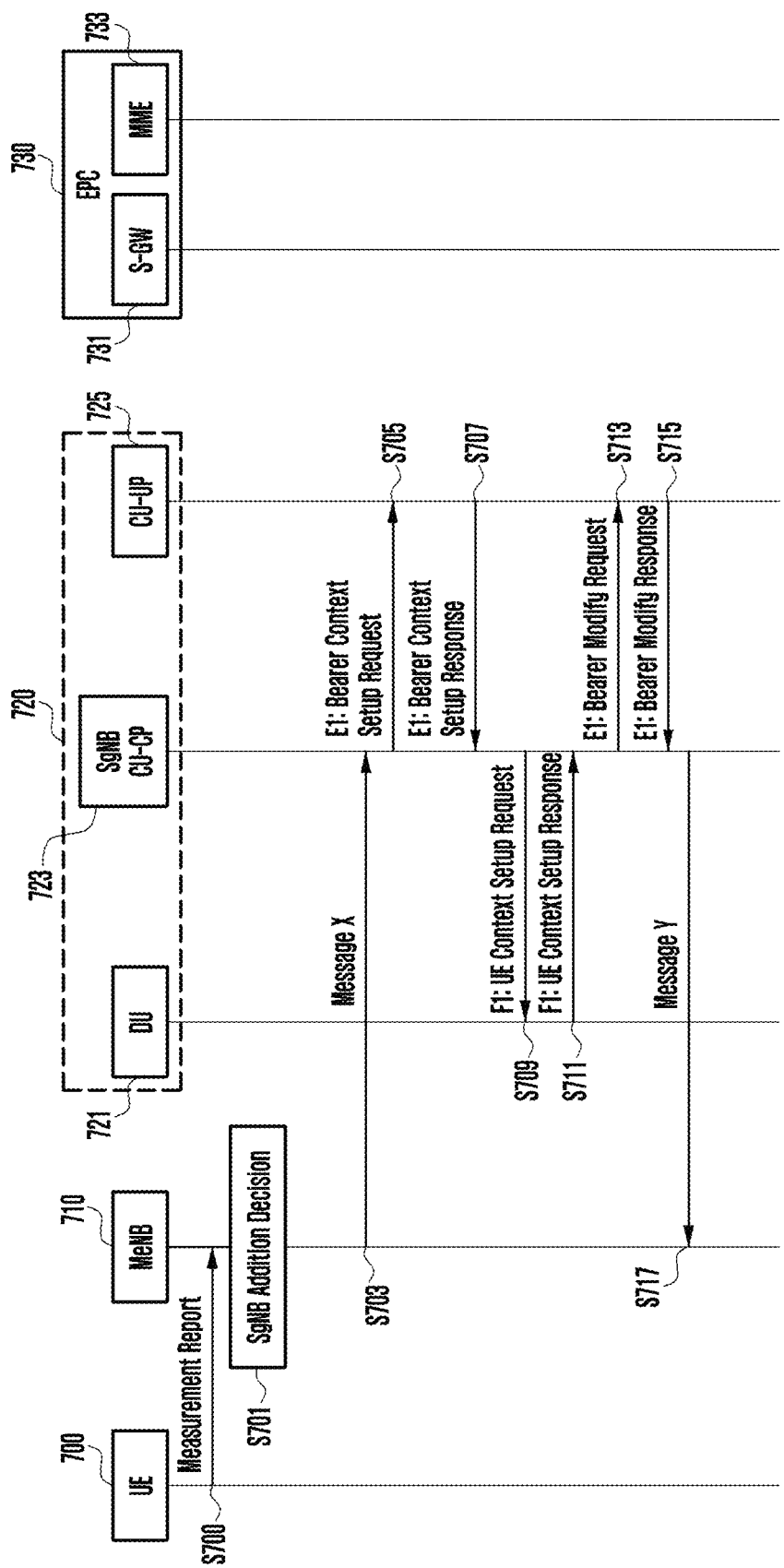

METHOD AND APPARATUS FOR PERFORMING DUAL CONNECTIVITY IN HETEROGENEOUS NETWORK

CROSS-REFERENCE TO RELATED APPLICATION

This application is based on and claims priority under 35 U.S.C. 119 to Korean Patent Application No. 10-2018-0100489 filed on Aug. 27, 2018 in the Korean Intellectual Property Office, the disclosure of which is herein incorporated by reference in its entirety.

BACKGROUND

1. Field

The disclosure relates to a method and apparatus for performing dual connectivity in a heterogeneous network.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The LTE system has a data processing structure different from that of a next-generation mobile communication system. Specifically, in the LTE system, a terminal cannot perform given data pre-processing until it receives an uplink transmission resource from a network because a concatenation (RLC concatenation) function is placed in the radio link control (RLC) layer. When an uplink transmission resource is received, the packet data convergence protocol (PDCP) layer forms one RLC PDU by concatenating PDCP packet data units (PDUs) and transmits the RLC PDU to the medium access control (MAC) layer for data transmission. In contrast, the next-generation mobile communication system has a data processing structure in which the RLC layer forms an RLC PDU by processing PDCP PDUs received from the PDCP layer before an uplink transmission resource is received because the concatenation (RLC concatenation) function is not included in the RLC layer and transmits the RLC PDU to the MAC layer, and the MAC layer can previously generate a MAC subheader and a MAC SDU.

Meanwhile, in the next-generation communication system, a variety of types of research for improving data processing speed in order to achieve the object are carried out.

SUMMARY

The disclosure may provide a method and apparatus for a control unit-control plane (CU-UP) included in a secondary node (SN) (or secondary gNB (SgNB)) to transmit a message, including indication information indicating whether the packet data convergence protocol (PDCP) version of a bearer has been changed, to a CU-UP included in a secondary node in a wireless communication system supporting evolved universal terrestrial radio access and new radio dual connectivity (EN-DC).

The disclosure may provide a method and apparatus for a CU-UP included in a secondary node to allocate a PDCP sequence number (SN) to at least one downlink (DL) packet based on whether the PDCP version of a bearer has been changed in a wireless communication system supporting EN-DC.

The disclosure may provide a method and apparatus for a CU-UP included in a secondary node to align order of at least one uplink (UL) packet based on whether the PDCP version of a bearer has been changed in a wireless communication system supporting EN-DC.

According to an embodiment of the disclosure, a method of a central unit-control plane (CU-CP) included in a secondary node (SN) (or secondary gNB (SgNB)) in a wireless communication system supporting evolved universal terrestrial radio access and new radio dual connectivity (EN-DC) includes receiving, from a master node (MN) (or master eNB (MeNB)), a first message for requesting the SgNB to allocate a radio resource for a bearer, and transmitting a second message, including indication information indicating whether a packet data convergence protocol (PDCP) version of the bearer has been changed, to the CU-UP included in the SgNB. The indication information is generated based on the first message.

According to an embodiment of the disclosure, a method of a central unit-user plane (CU-UP) included in a secondary node (SN) (or secondary gNB (SgNB)) in a wireless communication system supporting evolved universal terrestrial radio access and new radio dual connectivity (EN-DC) includes receiving a first message, including indication information indicating whether a packet data convergence protocol (PDCP) version of a bearer has been changed, from a central unit-control plane (CU-CP) included the SgNB, receiving a second message, including count information, from the CU-CP, and allocating a PDCP sequence number to at least one downlink packet received through the bearer based on at least one of the indication information or the count information.

According to an embodiment of the disclosure, a method of a central unit-user plane (CU-UP) included in a secondary node (SN) (or secondary gNB (SgNB)) in a wireless communication system supporting evolved universal terrestrial radio access and new radio dual connectivity (EN-DC) includes receiving a first message, including indication information indicating whether a packet data convergence protocol (PDCP) version of a bearer has been changed, from a central unit-control plane (CU-CP) included in the SgNB, receiving a second message, including count information, from the CU-CP, and aligning the sequence of at least one uplink packet received through the bearer based on at least one of the indication information or the count information.

According to an embodiment of the disclosure, a central unit-control plane (CU-CP) included in a secondary node (SN) (or secondary gNB (SgNB)) in a wireless communication system supporting evolved universal terrestrial radio access and new radio dual connectivity (EN-DC) includes a transceiver and at least one processor. The processor may be configured to control the transceiver to receive, from a master node (MN) (or master eNB (MeNB)), a first message for requesting the SgNB to allocate a radio resource for a bearer and to transmit a second message, including indication information indicating whether a packet data convergence protocol (PDCP) version of the bearer has been changed, to the CU-UP included in the SgNB. The indication information may be generated based on the first message.

According to an embodiment of the disclosure, a central unit-user plane (CU-UP) included in a secondary node (SN) (or secondary gNB (SgNB)) in a wireless communication system supporting evolved universal terrestrial radio access and new radio dual connectivity (EN-DC) includes a transceiver and at least one processor. The processor may be configured to control the transceiver to receive a first message, including indication information indicating whether a packet data convergence protocol (PDCP) version of a bearer has been changed, from a central unit-control plane (CU-CP) included the SgNB and to receive a second message, including count information, from the CU-CP. The processor may be configured to control to allocate a PDCP sequence number to at least one downlink packet received through the bearer based on at least one of the indication information or the count information.

According to an embodiment of the disclosure, a central unit-user plane (CU-UP) included in a secondary node (SN) (or secondary gNB (SgNB)) in a wireless communication system supporting evolved universal terrestrial radio access and new radio dual connectivity (EN-DC) includes a transceiver and at least one processor. The processor may be configured to control the transceiver to receive a first message, including indication information indicating whether a packet data convergence protocol (PDCP) version of a bearer has been changed, from a central unit-control plane (CU-CP) included in the SgNB and to receive a second message, including count information, from the CU-CP. The processor may be configured to control to align the sequence of at least one uplink packet received through the bearer based on at least one of the indication information or the count information. Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 7A and 7B illustrate a flowchart of an operation for a terminal supporting EN-DC to add a secondary node so that the radio resource of a SgNB can be allocated to the terminal;

DETAILED DESCRIPTION

Figure 1:
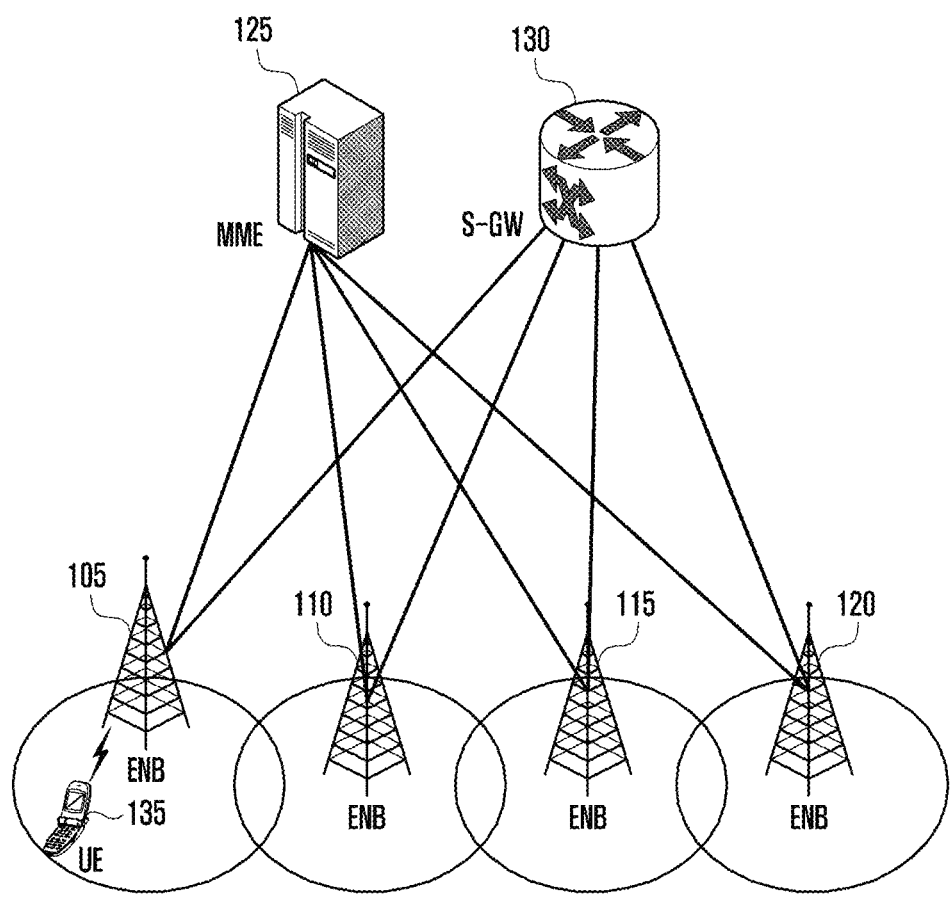
FIG. 1 is a diagram showing the architecture of an LTE system.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, an operation principle of the disclosure is described in detail with reference to the accompanying drawings. In describing the disclosure, a detailed description of a related known function or configuration will be omitted if it is deemed to make the gist of the disclosure unnecessarily vague. Furthermore, terms to be described hereunder have been defined by taking into consideration functions in the disclosure, and may be different depending on a user, an operator's intention or practice. Accordingly, each term should be defined based on contents over the entire specification.

In describing the disclosure, a detailed description of a related known function or configuration will be omitted if it is deemed to make the gist of the disclosure unnecessarily vague. Embodiments of the disclosure are described hereinafter with reference to the accompanying drawings.

In the following description, a term to identify an access node, a term to denote network entities, a term to denote messages, a term to denote an interface between network entities, and a term to denote a variety of types of identity information have been illustrated for convenience of description. Accordingly, the disclosure is not limited to the following terms, and other terms to denote targets having equivalent technical meanings may be used.

For convenience of description, in the disclosure, terms and names defined in long term evolution (LTE) of a $3^{rd}$ generation partnership project (hereinafter referred to as "3GPP"), new radio (NR) standards are used. However, the disclosure is not restricted by the terms and names, and may be identically applied to systems complying with other standards.

First, terms used in this specification are defined.

In this specification, a radio bearer may include a data radio bearer (DRB) and a signaling radio bearer (SRB).

For example, a data radio bearer (DRB) provided in a radio interface between a terminal and a base station is a path through which the data of a user plane is forwarded. A signaling radio bearer (SRB) may be a path through which the data of a control plane, such a radio resource control (RRC) layer and non-access-stratum (NAS) control message, is forwarded.

In this specification, a wireless communication system supported in a network over which a plurality of communication systems interwork may support interworking between heterogeneous technologies frequency bands (multi-RAT interworking). In this specification, an inter system supporting different communication networks may be basically divided into a terminal, a radio access network, and a plurality of core networks (CNs).

In this specification, a terminal may be an integrated terminal supporting all of a 4G radio access technology (E-UTRA), a radio access technology evolved from 4G (evolved E-UTRA), and a 5G radio access technology (new radio (NR)).

In this specification, a radio access network may support a plurality of radio access technologies (RATs), and may support interworking between heterogeneous technologies frequency bands (multi-RAT interworking).

For example, the radio access technology may be a new radio access network (new RAN) supporting all of a 4G radio access technology (E-UTRA), a radio access technology evolved from 4G (evolved E-UTRA), and a 5G radio access technology (new radio (NR)).

In this specification, a radio access network, a base station, and a network node may be used as the same meaning. A base station may include a 5G base station (or new radio base station or gNB) using the 5G radio access technology (new radio (NR)), a 4G base station (LTE-eNB) using the 4G radio access technology (E-UTRA), and a base station (eLTE eNB) using the radio access technology evolved from 4G (evolved E-UTRA). Furthermore, the base station (eLTE eNB) may support the 4G radio access technology and the 5G radio access technology at the same time. According to the specification of the disclosure, a wireless communication system, in which a terminal can perform communication with at least one cell associated with a first base station and at least one cell associated with a second base station, may relate to the following case: The first and second base stations relating to Dual Connectivity (DC) which concerns a 4G system; or the first base station relating to a 4G system and the second base station supporting an NR system (E-UTRA-NR Dual Connectivity, EN-DC). Furthermore, even though the wireless communication system being disclosed in the specification relates to an EN-DC system, the system need not be limited thereto and can also embrace a Multi-Radio Dual Connectivity (MR-DC) system.

In an EN-DC system disclosed in this specification, a main base station may be used as the same meaning as a master base station, a master node (MN), or a master eNB (MeNB). A sub-base station may be used as the same meaning as a secondary base station, a secondary node (SN), or a secondary gNB (SgNB).

In an EN-DC system disclosed in this specification, if a terminal moves to coverage of a secondary node, handover may occur. At this time, a master node may become a source base station, and the secondary node may become a target base station.

Likewise, in an EN-DC system disclosed in this specification, if a terminal deviates from coverage of a secondary node, handover may occur. At this time, the secondary node may become a source base station, and a master node may become a target base station.

Terms described in TS 38.401, that is, a gNB central unit (gNB-CU), a gNB-CU-control plane (gNB-CU-CP), a gNB-CU-user plane (gNB-CU-UP), and a gNB distributed unit (gNB-DU), may correspond to a central unit included in a secondary node (SN) (or secondary gNB (SgNB)), a CU-UP included in a secondary node (SN) (or secondary gNB (SgNB)), a CU-UP included in a secondary node, and a distributed unit (DU) included in a secondary node, in an EN-DC system disclosed in this specification.

That is, in this specification, the gNB-CU-control plane (gNB-CU-CP), the gNB-CU-user plane (gNB-CU-UP), and the gNB distributed unit (gNB-DU) may be indicated as a CU-CP, a CU-UP, and a DU, respectively.

In this specification, in an EN-DC system, a terminal may be connected to one eNB operating as a master node and one en-gNB operating as a secondary node.

The eNB may be connected to an EPC through an S1 interface and connected to the en-gNB through an X2 interface. The en-gNB may be connected to the EPC through the S1. The en-gNB may be connected to the EPC through an S1-U interface and other en-gNB via an X2-U interface.

FIG. 1 is a diagram showing the architecture of an LTE system.

Referring to FIG. 1, the radio access network of the LTE system is configured with next-generation evolved Node Bs (hereinafter referred to as "ENBs", "Node Bs" or "base stations") 105, 110, 115, and 120, a mobility management entity (MME) 125, and a serving-gate (S-GW) 130. A user equipment (hereinafter referred to as a "UE or terminal") 135 accesses an external network through the ENBs 105~120 and the S-GW 130.

In FIG. 1, the ENBs 105~120 correspond to the existing Node Bs of an universal mobile telecommunication system (UMTS) system. The ENB is connected to the UE 135 through a radio channel and performs a more complex function than the existing Node B. In the LTE system, all of types of user traffic including real-time services, such as voice over IP (VoIP), through the Internet protocol, are served through a shared channel. Accordingly, a device that performs schedules by collecting state information, such as the buffer state, available transmission power state, and channel state of UEs, is used. The ENBs 105~120 are in charge of such a device. In general, one ENB controls multiple cells. For example, in order to implement the transfer rate of 100 Mbps, the LTE system uses orthogonal frequency division multiplexing (hereinafter referred to as "OFDM") as a radio access technology in the 20 MHz bandwidth, for example. Furthermore, the LTE system adopts an adaptive modulation & coding (hereinafter referred to as "AMC") scheme for determining a modulation scheme and a channel coding rate based on the channel state of a UE. The S-GW 130 provides a data bearer and generates or removes a data bearer under the control of the MME 125. The MME 125 is in charge of various control functions in addition to a mobility management function for a UE, and is connected to multiple ENBs.

Figure 2:
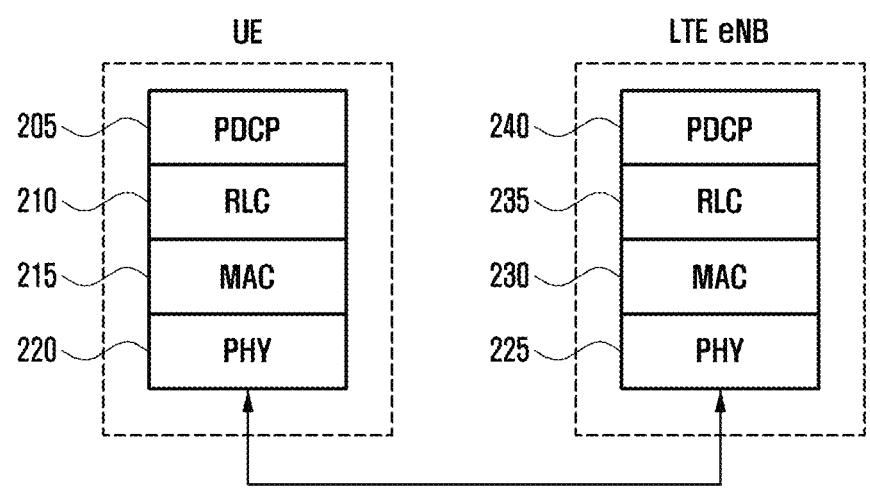
FIG. 2 is a diagram showing a radio protocol structure in the LTE system.

FIG. 2 is a diagram showing a radio protocol structure in an LTE system to which the disclosure may be applied.

Referring to FIG. 2, the radio protocol of the LTE system includes packet data convergence protocols (PDCPs) 205 and 240, radio link control (RLC) 210 and 235, and medium access control (MAC) 215 and 230 in a UE and an ENB, respectively. The PDCPs 205 and 240 are in charge of an operation, such as IP header compression/restoration. Major functions of the PDCP are summarized as follows.

Header compression and decompression: ROHC only
Transfer of user data
In-sequence delivery of upper layer PDUs in PDCP re-establishment procedure for RLC AM
Reordering function (for split bearers in DC (only support for RLC AM): PDCP PDU routing for transmission and PDCP PDU reordering for reception)

Duplicate detection of lower layer SDUs in PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink.

The RLC 210, 235 reconfigures a PDCP packet data unit (PDU) in a proper size and performs an ARQ operation. Major functions of the RLC are summarized as follows.

Transfer of upper layer PDUs

ARQ function (Error Correction through ARQ (only for AM data transfer))

Concatenation, segmentation and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC 215, 230 is connected to multiple RLC layer devices configured in one UE, and performs an operation of multiplexing RLC PDUs with a MAC PDU and demultiplexing RLC PDUs from a MAC PDU. Major functions of the MAC are summarized as follows.

Mapping between logical channels and transport channels

Multiplexing/demultiplexing of MAC SDUs belonging to one or different logical channels into/from transport blocks (TB) delivered to/from the physical layer on transport channels)

Scheduling information reporting

Error correction through HARQ

Priority handling between logical channels of one UE

Priority handling between UEs by means of dynamic scheduling

MBMS service identification

Transport format selection

Padding

A physical layer 220, 225 performs an operation of channel-coding and modulating higher layer data, generating the higher layer data into an OFDM symbol, and transmitting the OFDM symbol through a radio channel or of demodulating an OFDM symbol received through a radio channel, channel-decoding the OFDM symbol, and transmitting the OPDM symbol to a higher layer.

Figure 3:
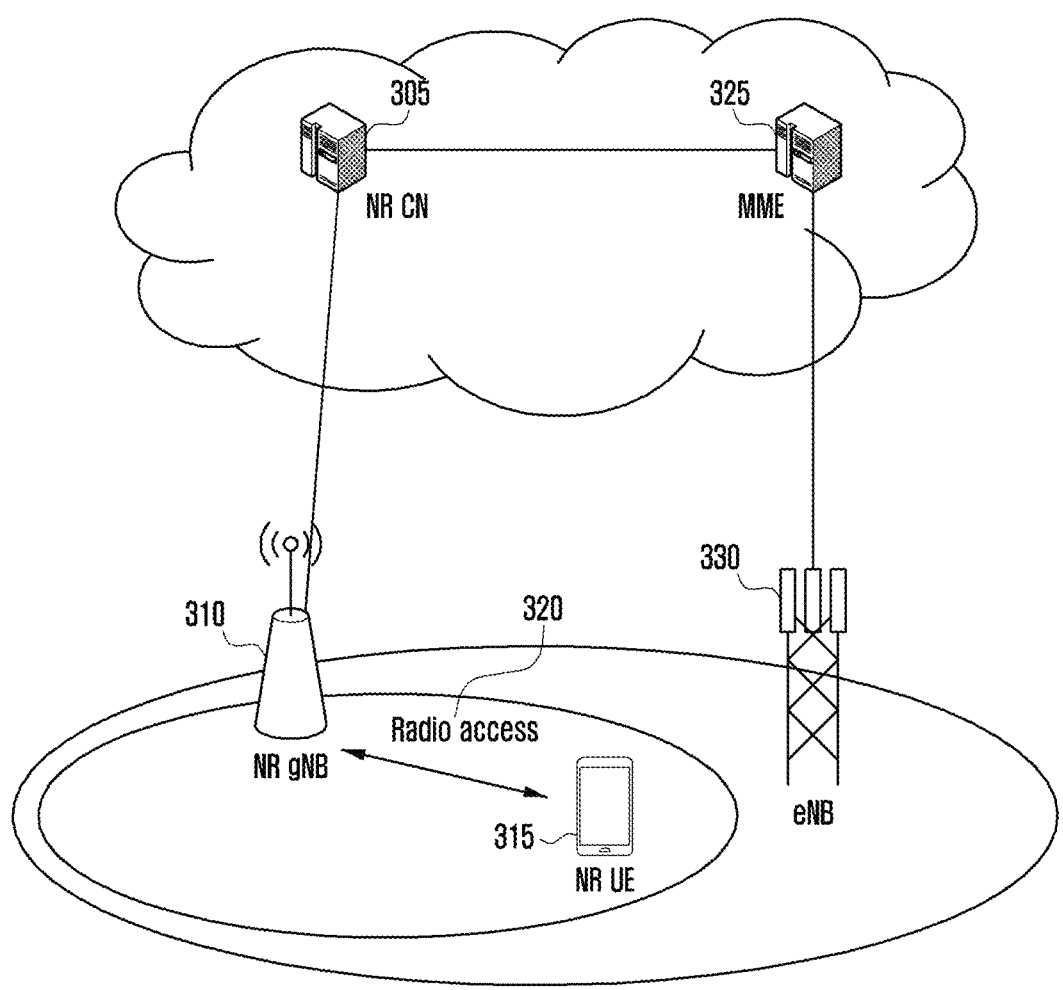
FIG. 3 is a diagram showing the architecture of a next-generation mobile communication system according to an embodiment of the disclosure.

FIG. 3 is a diagram showing the architecture of a next-generation mobile communication system to which the disclosure may be applied.

Referring to FIG. 3, the radio access network of the next-generation mobile communication system (hereinafter referred to as "NR" or "5G") is configured with a new radio Node B (hereinafter referred to as an "NR gNB" or an "NR base station") 310 and a new radio core network (NR CN) 305. A new radio user equipment (hereinafter referred to as an "NR UE" or a "terminal") 315 accesses an external network through the NR gNB 310 and the NR CN 305.

In FIG. 3, the NR gNB 310 corresponds to the existing evolved Node B (eNB) of an LTE system. The NR gNB is connected to the NR UE 315 through a radio channel 320, and may provide an excellent service compared to the existing Node B. In a next-generation mobile communication system, a device for performing scheduling by collecting state information, such as the buffer state, available transmission power state, and channel state of UEs is used because all of types of user traffic are served through a shared channel. The NR gNB 310 is in charge of the device. In general, one NR gNB controls multiple cells. In order to implement ultra-high speed data transfer compared to the existing LTE, the next-generation mobile communication system may have the existing maximum bandwidth or more and may additionally graft the beamforming technology using OFDM as a radio access technology. Furthermore, the next-generation mobile communication system adopts the AMC scheme that determines a modulation scheme and a channel coding rate based on the channel state of a UE. The NR CN 305 performs functions, such as mobility support, a bearer configuration, and a QoS configuration. The NR CN is in charge of various control functions in addition to a mobility management function for a UE, and is connected to multiple eNBs. Furthermore, the next-generation mobile communication system may also operate in conjunction with the existing LTE system. The NR CN is connected to an MME 325 through a network interface. The MME is connected to an eNB 330, that is, the existing base station.

Figure 4:
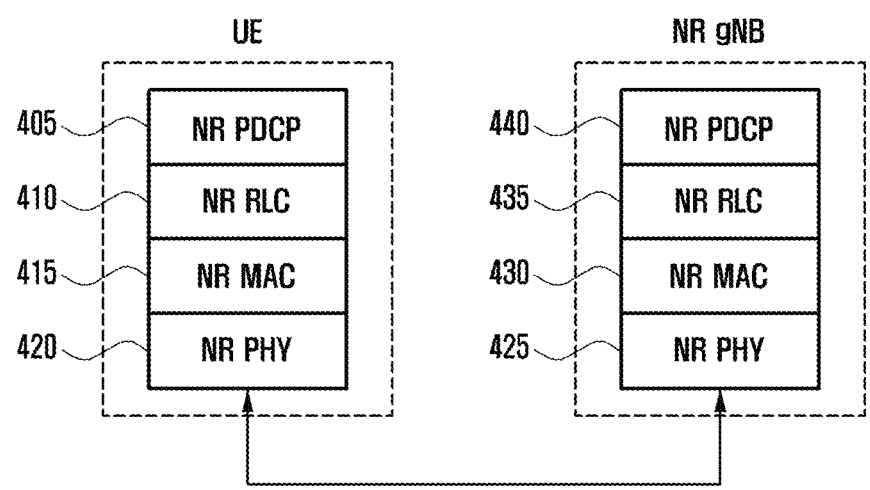
FIG. 4 is a diagram showing the radio protocol structure of a next-generation mobile communication system according to an embodiment of the disclosure.

FIG. 4 is a diagram showing the radio protocol structure of a next-generation mobile communication system to which the disclosure may be applied.

Referring to FIG. 4, the radio protocol of the NR is configured with NR PDCPs 405 and 440, NR RLC 410 and 435, and NR MAC 415 and 430, respectively, in an NR UE and an NR base station. Major functions of the NR PDCP 405, 440 may include some of the following functions.

Header compression and decompression: ROHC only

Transfer of user data

In-sequence delivery of upper layer PDUs

PDCP PDU reordering for reception

Duplicate detection of lower layer SDUs

Retransmission of PDCP SDUs

Ciphering and deciphering

Timer-based SDU discard in uplink.

The reordering function of the NR PDCP entity refers to a function for sequentially reordering PDCP PDUs received from a lower layer based on a PDCP sequence number (SN). The reordering function may include a function for transmitting data to a higher layer in a reordered sequence. Furthermore, the reordering function of the NR PDCP entity may include a function for reordering sequences and recording lost PDCP PDUs, a function for making a status report on lost PDCP PDUs to the transmission side, and a function for requesting the retransmission of lost PDCP PDUs.

Major functions of the NR RLC 410, 435 may include some of the following functions.

Transfer of upper layer PDUs

In-sequence delivery of upper layer PDUs

Out-of-sequence delivery of upper layer PDUs

Error Correction through ARQ

Concatenation, segmentation and reassembly of the RLC SDUs

Re-segmentation of RLC data PDUs

Reordering of RLC data PDUs

Duplicate detection

Protocol error detection

RLC SDU discard

RLC re-establishment

The in-sequence delivery function for the NR RLC entity refers to a function for transmitting RLC SDUs, received from a lower layer, to a higher layer in sequence, and may include a function for reassembling and transmitting multiple RLC SDUs if one RLC SDU has been originally segmented into the multiple RLC SDUs and received. Furthermore, the in-sequence delivery function of the NR RLC entity may include a function for reordering received RLC PDUs based on an RLC sequence number (SN) or a PDCP sequence number (SN) and a function for reordering sequences and recording lost RLC PDUs. Furthermore, the in-sequence delivery function of the NR RLC entity may include a function for transmitting a status report on lost RLC PDUs to the transmission side, a function for requesting the retransmission of lost RLC PDUs, and a function for transmitting only RLC SDUs prior to a lost RLC SDU to a higher layer in sequence if the lost RLC SDU is present. Furthermore, the in-sequence delivery function of the NR RLC entity may include a function for transmitting all RLC SDUs, received before a given timer expires, to a higher layer in sequence when the timer expires although there is a lost RLC SDU or a function for transmitting all RLC SDUs, received so far, to a higher layer when a given timer expires although there is a lost RLC SDU. Furthermore, in the above, RLC PDUs may be processed in sequence that they are received (in order of arrival regardless of the sequence of sequence numbers) and transmitted to the PDCP entity regardless of their sequence (i.e., out-of sequence delivery). In the case of a segment, segments stored in a buffer or segments to be received subsequently may be received and reconfigured into one complete RLC PDU. The one complete RLC PDU may be processed and transmitted to the PDCP entity. The NR RLC layer may not include a concatenation function. The concatenation function may be performed in the NR MAC layer or may be substituted with the multiplexing function of the NR MAC layer.

The out-of-sequence delivery function for the NR RLC entity refers to a function for directly transmitting RLC SDUs received from a lower layer to a higher layer regardless of their sequence. The out-of-sequence delivery function may include a function for reassembling multiple RLC SDUs if one RLC SDU has been originally segmented into the multiple RLC SDUs and received and a function for storing the RLC SN or PDCP SN of received RLC PDUs, reordering their sequence, and recording lost RLC PDUs.

The NR MAC 415, 430 may be connected to multiple NR RLC layer devices configured in one UE. Major functions of the NR MAC may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding An NR PHY layer 420, 425 may perform an operation of channel-coding and modulating higher layer data, generating the higher layer data into an OFDM symbol, and transmitting the OFDM symbol to a radio channel or demodulating an OFDM symbol received through a radio channel, channel-decoding the OFDM symbol, and transferring the OFDM symbol to a higher layer.

Figure 5A:
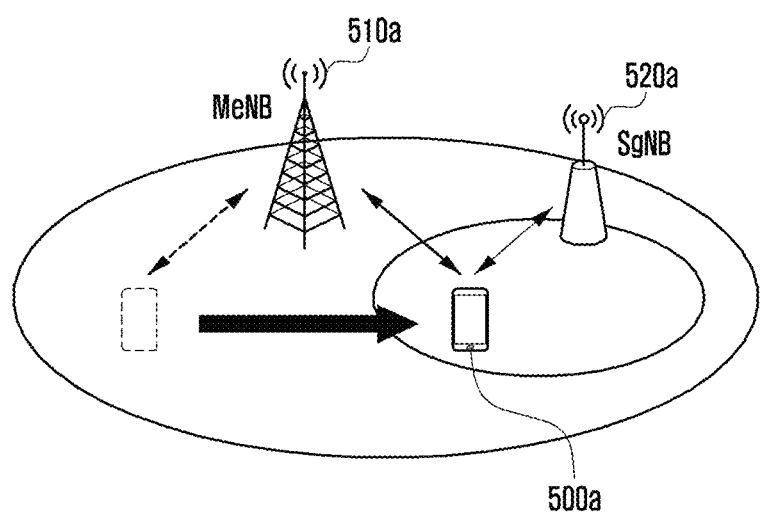
FIG. 5A is a diagram illustrating a SgNB addition and release scenario in a wireless communication system supporting EN-DC.
Figure 5B:
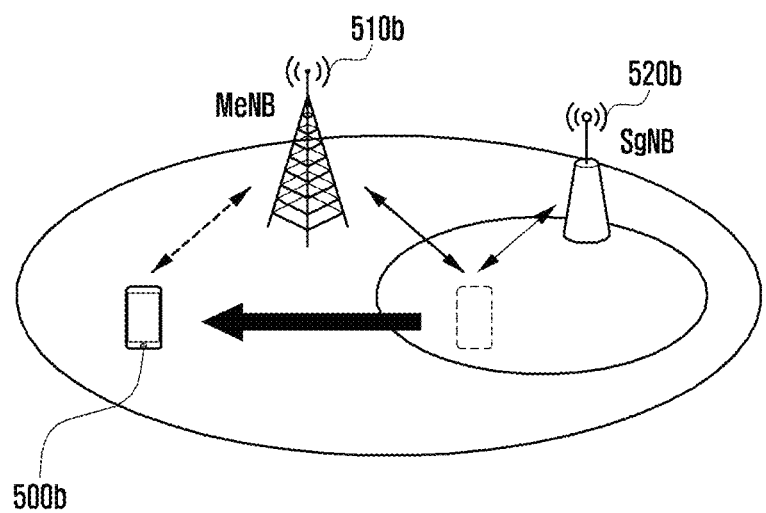
FIG. 5B is a diagram illustrating a SgNB addition and release scenario in a wireless communication system supporting EN-DC.

FIG. 5A is a diagram for a SgNB addition and release scenario in a wireless communication system supporting EN-DC. FIG. 5B is a diagram for a SgNB addition and release scenario in a wireless communication system supporting EN-DC.

For example, in the LTE system, when a terminal performs handover from a source base station to a target base station, the source base station may support data forwarding by forwarding current configuration information of the terminal to the target base station.

The data forwarding means that data service is provided to a user without latency in such a manner that a source base station forwards a received packet (e.g., PDCP SDU) to a target base station through an X2 interface.

In the LTE system, if a standard spec. version is different between a source base station and a target base station, current configuration information of a terminal may be reset, and the terminal may be configured with new configuration information.

For example, upon handover, a source base station may reset current configuration information of a terminal through an RRC connection reconfiguration message, may transmit information indicative of a configuration (e.g., full configuration) with new configuration information, and may transmit the new configuration information to a target base station through a handover request message.

An EN-DC system is a system in which a 4G (E-UTRA) base station and a 5G (New-Radio (hereinafter NR)) base station are connected to a 4G core network.

As shown in FIGS. 5A and 5B, in the EN-DC system, a 4G base station may play the role of a master node (MN) (or MeNB) 510a, 510b that processes a control signal. The 5G base station may play the role of a secondary node (SN) (or SgNB) 520a, 520b that processes data based on a control signal received from an MeNB.

As shown in FIGS. 5A and 5B, the SgNB has smaller coverage than the MeNB, but may have a high data rate because it uses a wide band of a relatively high frequency.

A terminal 500a, 500b for which EN-DC is supported is basically connected to the MeNB, and may use a radio resource having the high data rate of the SgNB through a procedure, such as SgNB addition/release/modification, depending on the condition.

For example, as shown in FIG. 5A, in the EN-DC system, when the terminal 500a moves to coverage of the SgNB 520a, a SgNB addition procedure may be performed. As shown in FIG. 5B, in the EN-DC system, when a terminal is out of coverage of a SgNB, an SgNB release procedure may be performed.

As shown in FIG. 5A, in the EN-DC system, the terminal may multi-access the MeNB 510a and the SgNB through SgNB addition. At this time, data forwarding may be supported for an SgNB-added bearer.

In the LTE system, upon handover, all pieces of bearer information of a terminal are forwarded. In contrast, in the EN-DC system, only information on SgNB-added bearers may be forwarded so that a SgNB allocates a radio resource for a bearer. For example, a source base station in the EN-DC system may forward change configuration information (delta configuration) of a bearer, that is, the subject of data forwarding, to a terminal and a target base station.

Figure 6:
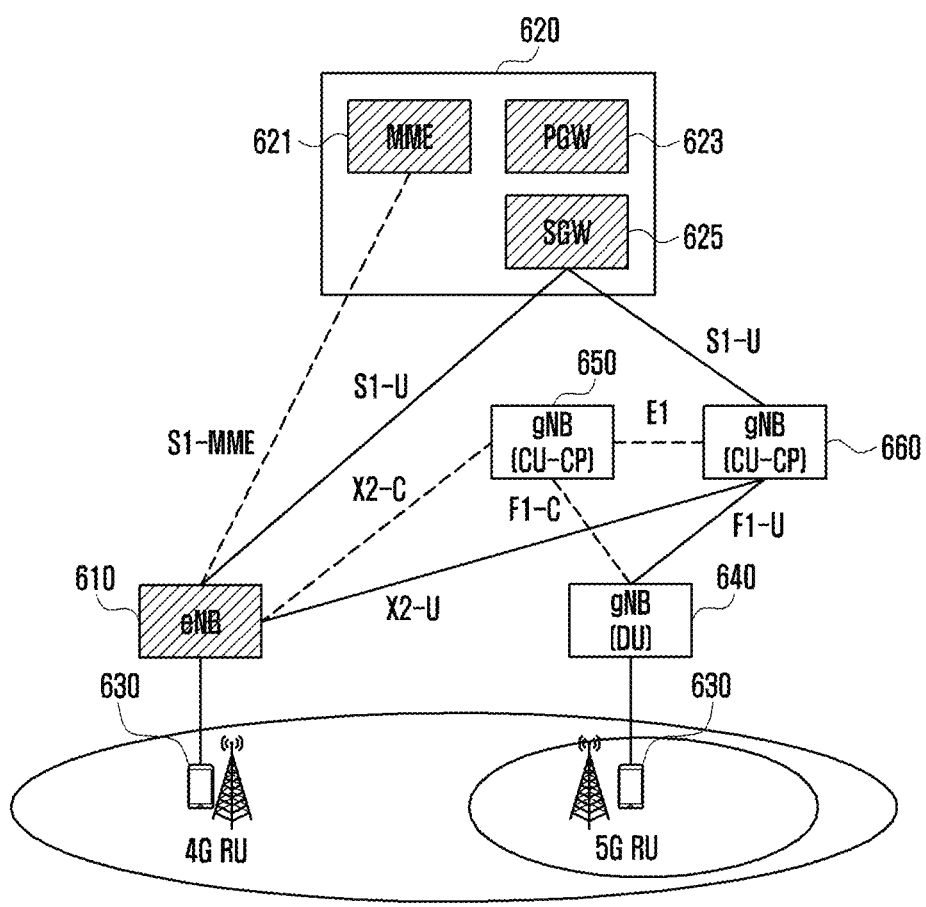
FIG. 6 is a diagram showing the structure of network elements included in a wireless communication system supporting EN-DC.

FIG. 6 is a diagram showing the structure of network elements included in a wireless communication system supporting EN-DC.

As shown in FIG. 6, a 4G eNB is configured with one network element (NE), and a 5G gNB is configured with a CU-CP, a CU-UP, and a DU, that is, three network elements.

As shown in FIG. 6, the CU-CP that is a control plane, the CU-UP that is a user plane, and the DU including MAC/RLC/PHY layers may be connected to an E1, an F1 Control plane interface (F1-C)/F1 user plane interface (F1-U), that is, external interfaces, respectively.

Figure 7B:
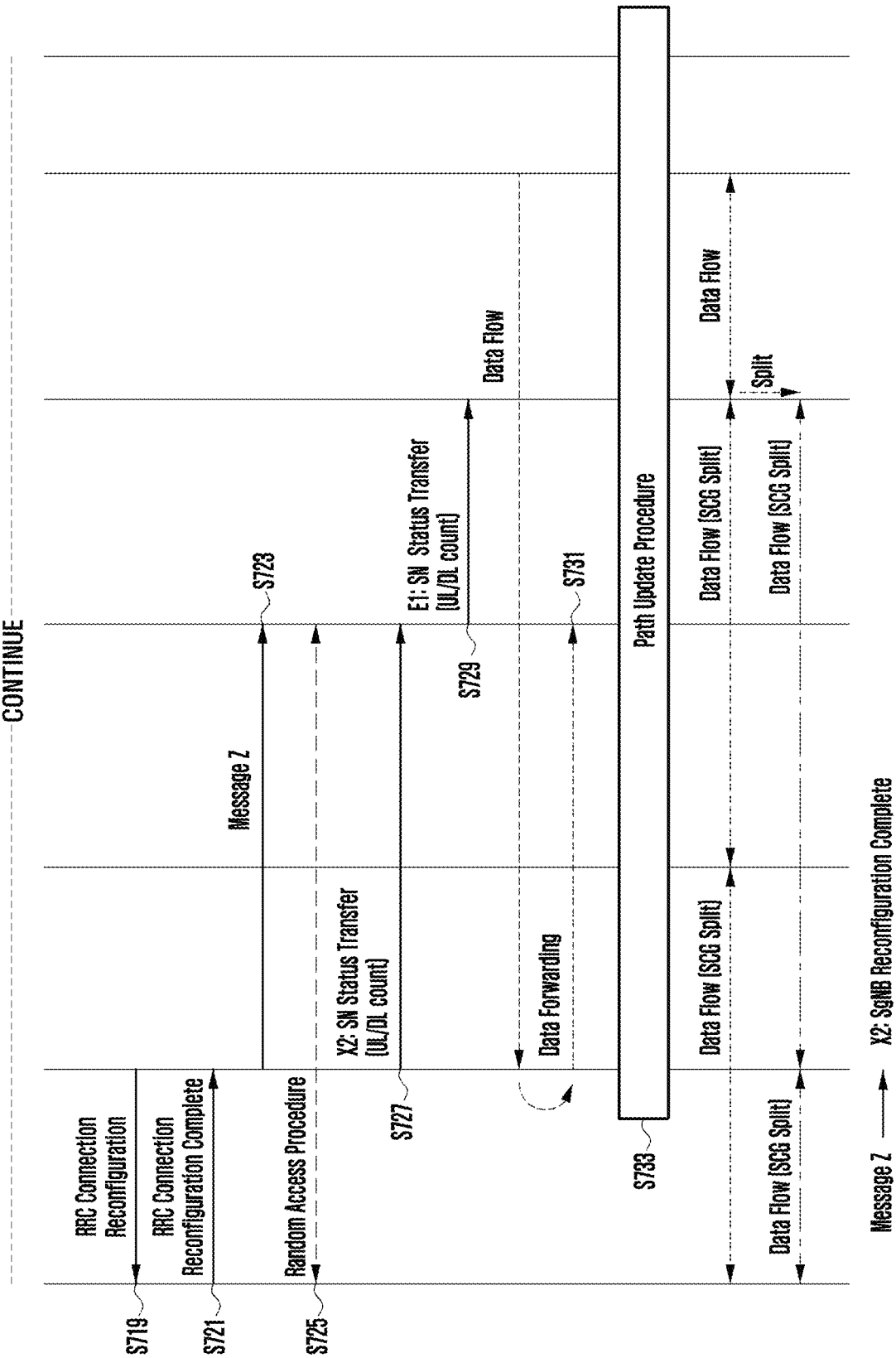

FIGS. 7A and 7B are flowcharts of an operation for a UE supporting EN-DC to add a secondary node so that the radio resource of a SgNB can be allocated to the UE.

At operation S700, the UE transmits a measurement report to an MeNB. At operation S701, the MeNB makes a SgNB addition decision. At operation S703, the MeNB may transmit a SgNB addition request message through a CU-CP included in a SgNB.

At operations S705 to S715, the CU-CP may transmit and receive messages (e.g., bearer context setup request, bearer context setup response, bearer modify request, bearer modify response) to and from the CU-UP of the MeNB through an E1 interface, and may transmit and receive messages (e.g., UE context setup request, UE context setup response) to and from a DU through an F1 interface.

At operation S717, the CU-CP may transmit SgNB addition request acknowledge to the MeNB. At operation S719, the MeNB transmits an RRC connection reconfiguration message to the UE. At operation S721, the UE may transmit an RRC connection reconfiguration complete message to the MeNB.

At operation S723, the MeNB may transmit a SgNB reconfiguration complete message to the CU-CP. At operation S725, a random access procedure may be performed between the UE and the SgNB.

At operation S727, the MeNB may transmit a sequence number (SN) status transfer message to the CU-CP. At operation S729, the CU-CP may forward the SN status transfer message to the CU-UP.

At operation S731, a data forwarding procedure may be performed. At operation 707, a path update procedure may be performed.

In a radio system supporting EN-DC, in order to perform dual connectivity, an MeNB may transmit a SgNB addition request message to an SgNB. The CU-CP of the SgNB may transmit, to the CU-UP of the SgNB, information that belongs to the received SgNB addition request information and that is to be used in a user plane through an E1 interface, and may transmit information to be used in the RLC/MAC/PHY to the DU of SgNB through an F1 interface.

A MeNB may use an LTE PDCP or an NR PDCP, and a SgNB may use only an NR PDCP.

For example, if a MeNB requests a SgNB using an NR PDCP to allocate a radio resource for a bearer (hereinafter, "bearer of an LTE PDCP version") using an LTE PDCP, that is, if a MeNB performs SgNB addition, a change in the PDCP version of the bearer may occur because the type of the bearer is changed to use the NR PDCP (hereinafter the bearer of an NR PDCP version).

In this case, the MeNB may transmit, to a UE and the CU-CP included in the SgNB (e.g., target SgNB), information on a change in the PDCP version of the bearer for which SgNB addition has been requested through delta configuration information so that the radio resource of the SgNB is allocated to the MeNB.

For example, the UE may receive the information on a change in the PCDP version from the MeNB through an RRC connection reconfiguration message, may reset a PDCP based on the received information on the PCDP version change, and may initialize the PDCP sequence number of a downlink/UL packet to "0."

For example, the CU-CP included in the SgNB may receive the information on a PDCP version change from the MeNB through a SgNB addition request message. However, the CU-UP in charge of a PDCP layer cannot identify the information on a PDCP version change because a field for forwarding the information on a PDCP version change has not been generated in messages transmitted and received on the E1 interface between the CU-CP and the CU-UP.

Accordingly, the CU-UP included in the SgNB inevitably set a PDCP sequence number based on a SN status transfer message.

That is, when a MeNB using only an LTE PDCP requests SgNB addition, a mismatch occurs in the setting of a PDCP sequence number between a UE and a CU-UP included in a SgNB. Accordingly, there is a problem in that data is lost.

In order to solve this problem, an embodiment of the disclosure may provide a method capable of preventing a mismatch in the setting of a PDCP sequence number between a CU-UP responsible for a PDCP layer and a UE by generating a field for forwarding indication information, indicating whether a PDCP version has been changed, in messages transmitted and received on an E1 interface between a CU-CP and the CU-UP included in a SgNB.

Figure 8:
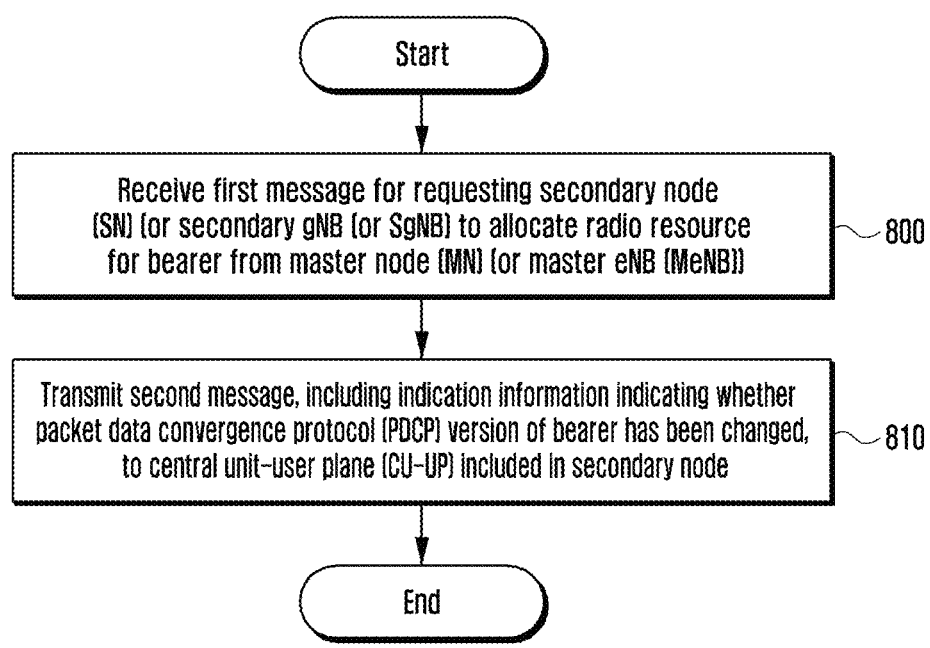
FIG. 8 is a flowchart showing an operation for a CU-CP included in a secondary node to transmit indication information, indicating whether a PDCP version has been changed, to a CU-UP according to various embodiments of the disclosure.

FIG. 8 is a flowchart showing an operation for a CU-CP included in a SgNB to transmit indication information, indicating whether a PDCP version has been changed, to the CU-UP of the SgNB according to various embodiments of the disclosure.

At operation 800, the CU-CP may receive a first message for requesting the SgNB to allocate a radio resource for a bearer from a master node (MN) (or master eNB (MeNB)).

The first message according to various embodiments of the disclosure may include a SgNB addition request message.

For example, the SgNB addition request may include delta configuration information. The delta configuration information may include information on SgNB-added bearers.

For example, the SgNB addition request may include information on a bearer for which SgNB addition has been requested information on the PDCP version of at least one bearer (e.g., a bearer of an NR PDCP version).

For example, the information on a bearer for which SgNB addition has been requested may be identified through E-RABs To Be Added List>E-RABs To Be Added Item>>E-RAB ID of the SgNB Addition Request Message described in 3GPP LTE document TS 36.423. Furthermore, the information on a bearer of an NR PDCP version may be identified through an E-RAB ID within CG-ConfigInfo>mcg-RB-Config of the MeNB to SgNB Container of the SgNB Addition Request Message described in 3GPP NR document 38.331.

At operation 703 of FIG. 7, E-RAB info included in the SgNB addition request transmitted through X2 signaling is information on a bearer for which SgNB addition has been requested. CG-ConfigInfo is information on a bearer of an NR PDCP version.

At operation 810, the CU-CP may transmit, to the CU-UP included in the SgNB, a second message including indication information indicating whether the packet data convergence protocol (PDCP) version of a bearer has been changed.

The indication information according to various embodiments of the disclosure may be generated based on the first message.

For example, whether the PDCP version has been changed may be identified based on information on at least one bearer for which SgNB addition has been requested and which is included in the first message and information on the PDCP version of the at least one bearer.

For example, the information on the PDCP version of at least one bearer relates to the version of the radio access technology of a PDCP used by the bearer, and may be called a "bearer of an LTE PDCP version" in a bearer using a PDCP supported in LTE and a "bearer of an NR PDCP version" in a bearer using a PDCP supported in NR.

The indication information indicating whether the PDCP version of a bearer has been changed according to various embodiments of the disclosure may be generated based on information on a bearer for which SgNB addition has been requested and which is included in the SgNB addition request received at operation 800 and information on the bearer of an NR PDCP version.

For example, a bearer that belongs to bearers for which SgNB addition has been requested and that is not a bearer of an NR PDCP version is a bearer type of an LTE PDCP version. The type of the bearer is inevitably changed because it should become a bearer of an NR PDCP version type in order to use a radio resource allocated by a SgNB.

That is, if the type of bearer using a radio resource allocated by a SgNB changes from an LTE PDCP version to an NR PDCP version, it may be said that there is a change in the PDCP version of the bearer.

The indication information indicating whether the PDCP version of a bearer has been changed according to various embodiments may be generated for each bearer for which SgNB addition has been requested.

The indication information indicating whether the PDCP version of a bearer has been changed according to various embodiments may be represented as 1 bit. For example, if a bit value is 0, this may be information indicating a case where there is no PDCP version change. If a bit value is 1, this may be information indicating a case where there is a PDCP version change.

The second message including the indication information indicating whether the PDCP version of a bearer has been changed according to various embodiments may include bearer context setup request messages transmitted and received on the E1 interface. For example, the bearer context setup request message may be transmitted at operation 705, as shown in FIG. 7.

Figure 9:
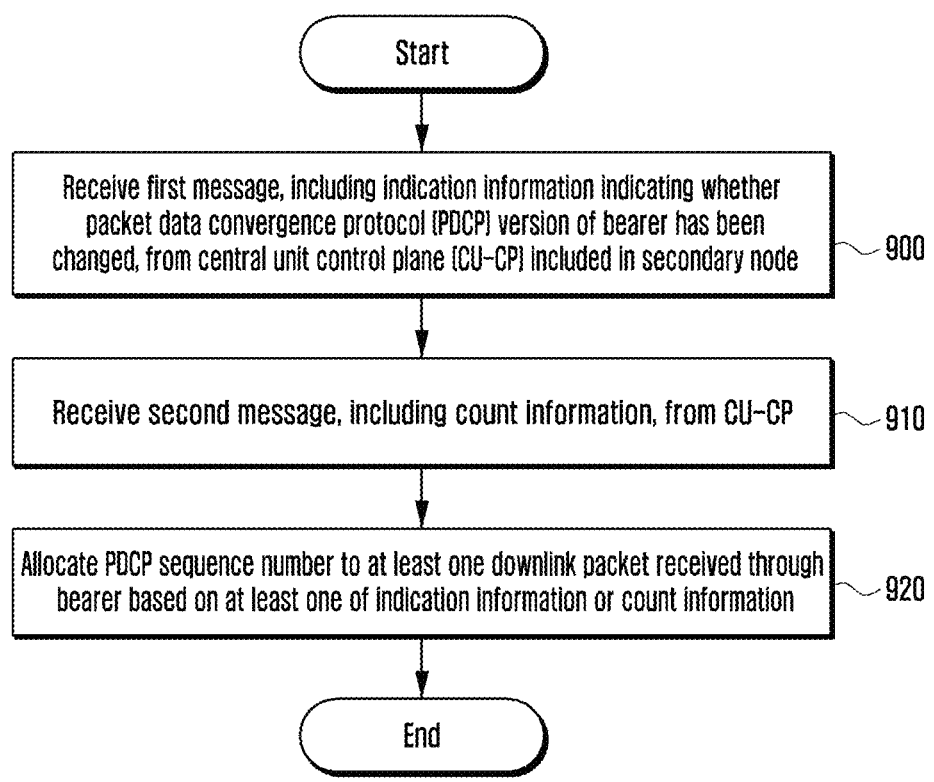
FIG. 9 is a flowchart showing an operation of various examples in which a CU-UP included in a secondary node allocates a PDCP sequence number (SN) to a DL packet based on indication information indicating whether a PDCP version has been changed according to various embodiments of the disclosure.
Figure 10:
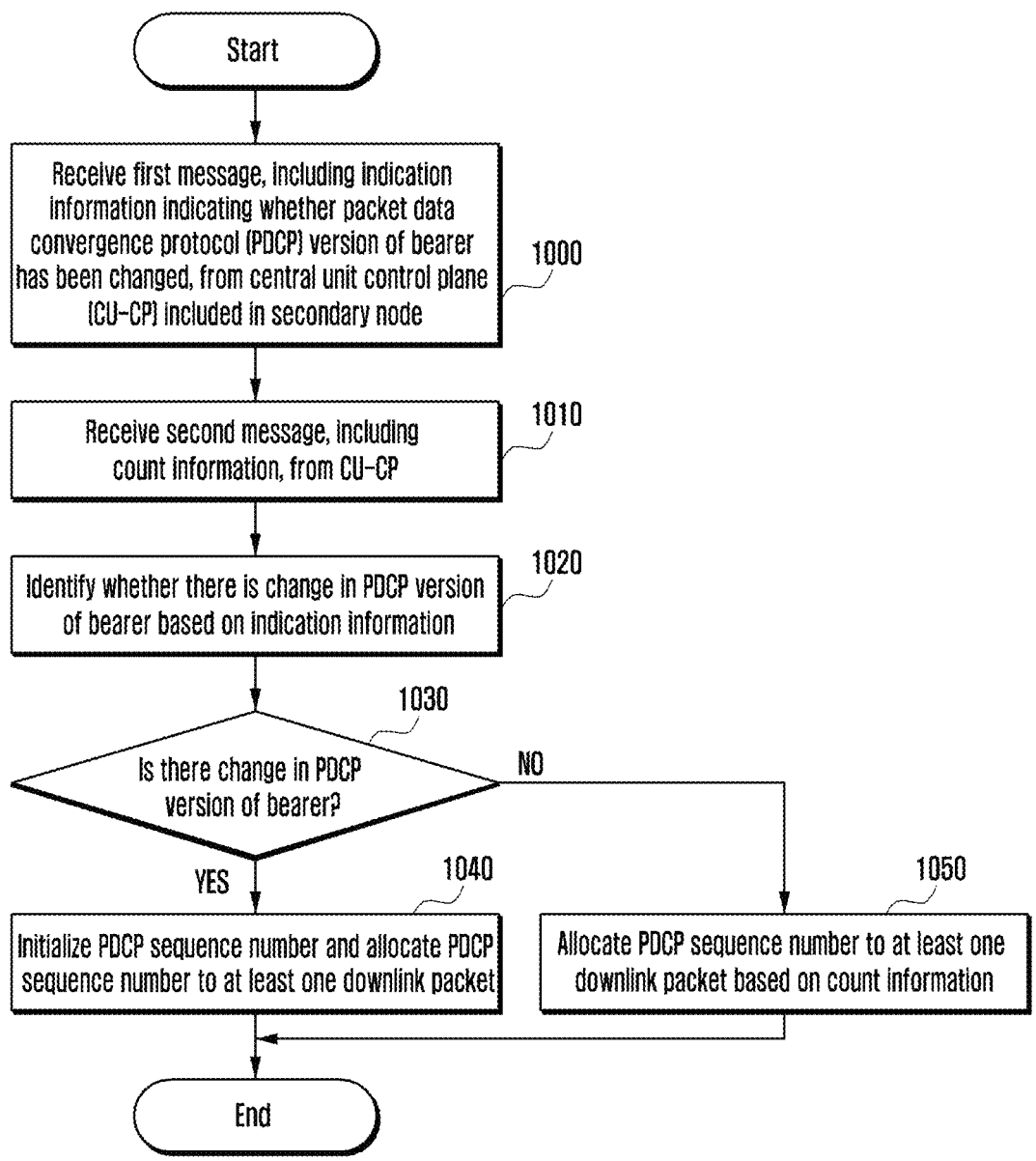
FIG. 10 is a flowchart showing an operation of various examples in which a CU-UP included in a secondary node allocates a PDCP sequence number (SN) to a DL packet based on indication information indicating whether a PDCP version has been changed according to various embodiments of the disclosure.

FIG. 9 is a flowchart showing an operation of various examples in which a CU-UP included in a SgNB allocates a PDCP sequence number (SN) to a DL packet based on indication information indicating whether a PDCP version has been changed according to various embodiments of the disclosure. FIG. 10 is a flowchart showing an operation of various examples in which a CU-UP included in a SgNB allocates a PDCP sequence number (SN) to a DL packet based on indication information indicating whether a PDCP version has been changed according to various embodiments of the disclosure.

At operation 900, the CP-UP may receive, from the CU-CP included in the SgNB, a first message including indication information indicating whether the PDCP version of a bearer has been changed.

For example, the first message may include the bearer context setup request message received at operation 705 of FIG. 7.

In this case, the indication information indicating whether the PDCP version of the bearer has been changed is 1 bit, and may be included in a field within the bearer context setup request message.

At operation 910, the CP-UP may receive a second message, including count information, from the CU-CP.

For example, the count information is information that notifies a SgNB that it should transmit and receive packets to and from a UE from which packet. The count information may include information (e.g., DL Count) indicative of the count of the first DL packet to be transmitted to the UE and information (e.g., UL Count) indicative of the count of the first UL packet to be received from the UE.

For example, the second message may include the SN status transfer message received at operation 729 of FIG. 7.

The SN status transfer message according to various embodiments of the disclosure is a message used in a handover execution step, and is a message transmitted from a source base station (MeNB in the case of FIG. 7) to a target base station (SgNB in the case of FIG. 7). The SN status transfer message may include count information notifying a target base station (SgNB in the case of FIG. 7) that it should transmit and receive packets to and from a UE from which packet.

For example, as shown in FIG. 7, the SN status transfer message is a message transmitted from the MeNB to the CU-CP included in the SgNB and transmitted from the CU-CP to the CU-UP.

For example, the count information is a count value of a PDCP protocol data unit (PDU), and may be represented as a value of 32 bits configured with a hyper frame number (HFN) and a PDCP sequence number (SN). The count information may include information (e.g., DL Count) indicative of the count of the first packet to be transmitted to a UE and information (e.g., UL Count) indicative of the count of the first packet to be received from the UE.

At operation 920, the CP-UP may allocate a PDCP sequence number to at least one DL packet received through the bearer, based on at least one of the indication information received at operation 900 or the count information received at operation 910.

For example, the CP-UP may identify whether there is a change in the PDCP version of a bearer based on the indication information. If there is a change in the PDCP version of the bearer, the CP-UP may initialize the PDCP sequence number and allocate a PDCP sequence number to at least one DL packet. If there is no change in the PDCP version of a bearer, the CP-UP may allocate the PDCP sequence number to at least one DL packet based on the count information.

This is described specifically with reference to FIG. 10.

Operations 1000 and 1010 correspond to operations 900 to 910 of FIG. 9.

At operation 1020, the CU-UP may identify whether there is a change in the PDCP version of the bearer based on the indication information received at operation 1000.

If it is identified that there is a change in the PDCP version of the bearer at operation 1030, the CU-UP may initialize a PDCP sequence number and allocate a PDCP sequence number to at least one DL packet at operation 1040.

That is, if it is identified that there is a change in the PDCP version of the bearer, the CU-UP may reset a PDCP sequence number to "0" without taking into consideration the count information received at operation 1010.

For example, initializing the PDCP sequence number may include allocating a PDCP sequence number 0 to the first DL packet transmitted by the UE and then perform PDCP sequence numbering.

The at least one DL packet according to various embodiments of the disclosure may include at least one DL packet data-forwarded from the MeNB and at least one DL packet, that is, a new packet received from a core network (e.g., 4G core network in the EN-DC system).

For example, the first DL packet transmitted from the SgNB to the UE may be the first DL packet data-forwarded from the MeNB.

As described above in FIG. 7B, if there is a change in the PDCP version of a bearer according to various embodiments of the disclosure, a UE may receive, from a MeNB, information on a PDCP version change through an RRC connection reconfiguration message, may reset a PDCP based on the received information on a PDCP version change, and may initialize the PDCP sequence number of a DL packet to "0."

That is, the CU-UP included in the SgNB according to various embodiments of the disclosure can initialize the PDCP sequence number to "0" if there is a change in the PDCP version of a bearer. Accordingly, a mismatch in the setting of the PDCP sequence number between the CU-UP responsible for the PDCP layer and a UE can be prevented, and thus a loss of data can be prevented.

Figure 14:
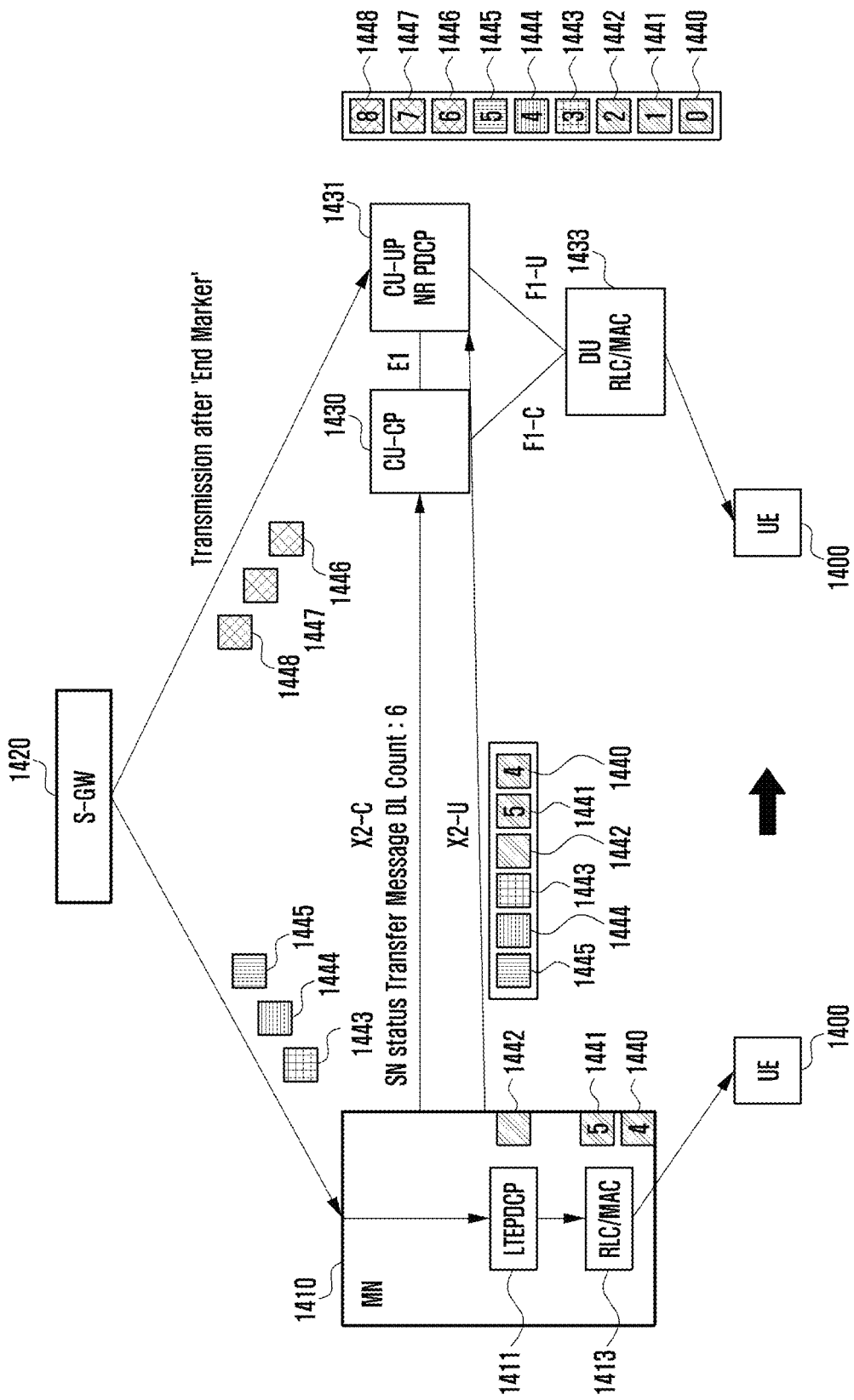
FIG. 14 is a diagram showing various examples in which a CU-UP included in a secondary node allocates a PDCP sequence number to a DL packet based on indication information indicating whether a PDCP version has been changed according to various embodiments of the disclosure.

This is described specifically with reference to FIG. 14.

If it is identified that there is no change in the PDCP version of the bearer at operation 1030, at operation 1050, the CU-UP may allocate a PDCP sequence number to at least one DL packet based on the count information.

For example, if it is identified that there is no change in the PDCP version of the bearer, the CU-UP may allocate a PDCP sequence number to at least one DL packet based on the count information (e.g., DL Count) indicative of the count of the first packet to be transmitted to a UE included in the SN status transfer message received at operation 1010.

Figure 13:
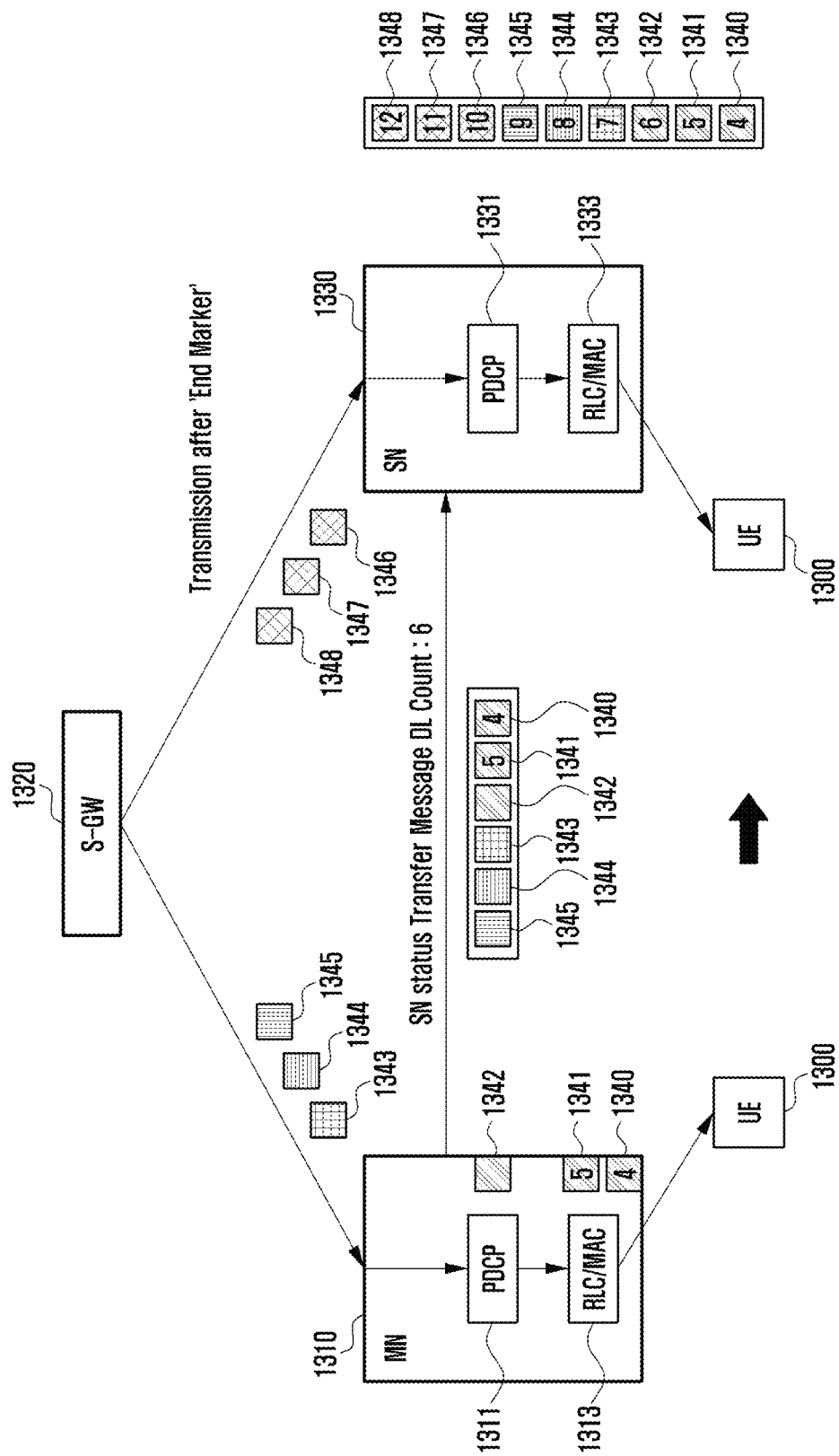
FIG. 13 is a diagram showing various examples in which a CU-UP included in a secondary node allocates a PDCP sequence number to a DL packet based on indication information indicating whether a PDCP version has been changed according to various embodiments of the disclosure.

This is described specifically with reference to FIG. 13.

Figure 11:
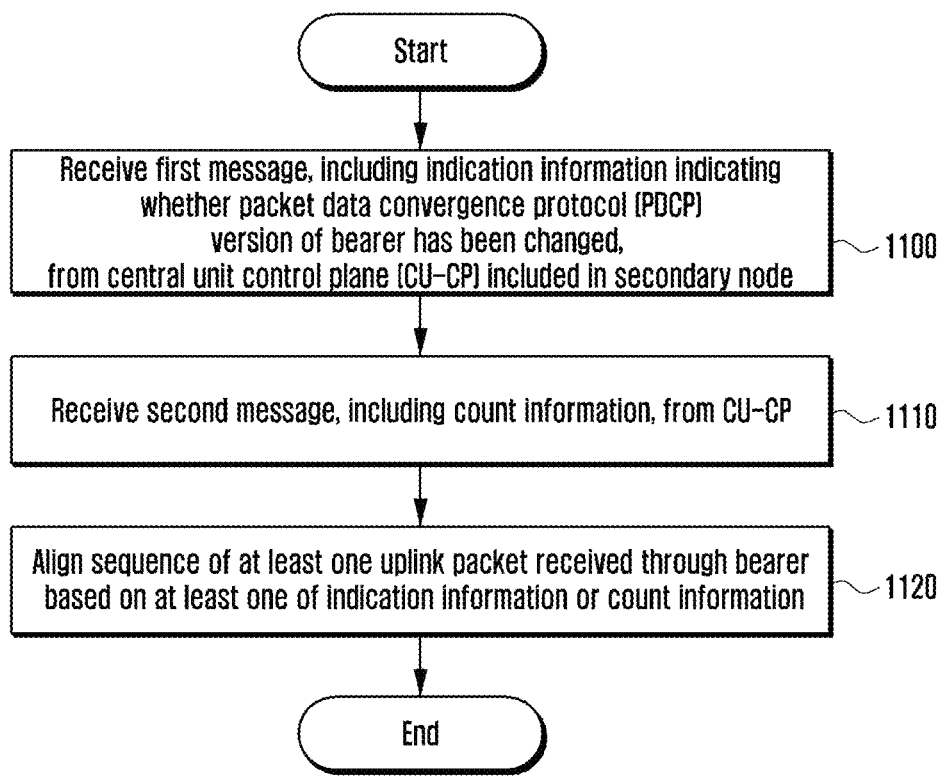
FIG. 11 is a flowchart showing an operation of various examples in which a CU-UP included in a secondary node aligns sequences of UL packets based on indication information indicating whether a PDCP version has been changed according to various embodiments of the disclosure.
Figure 12:
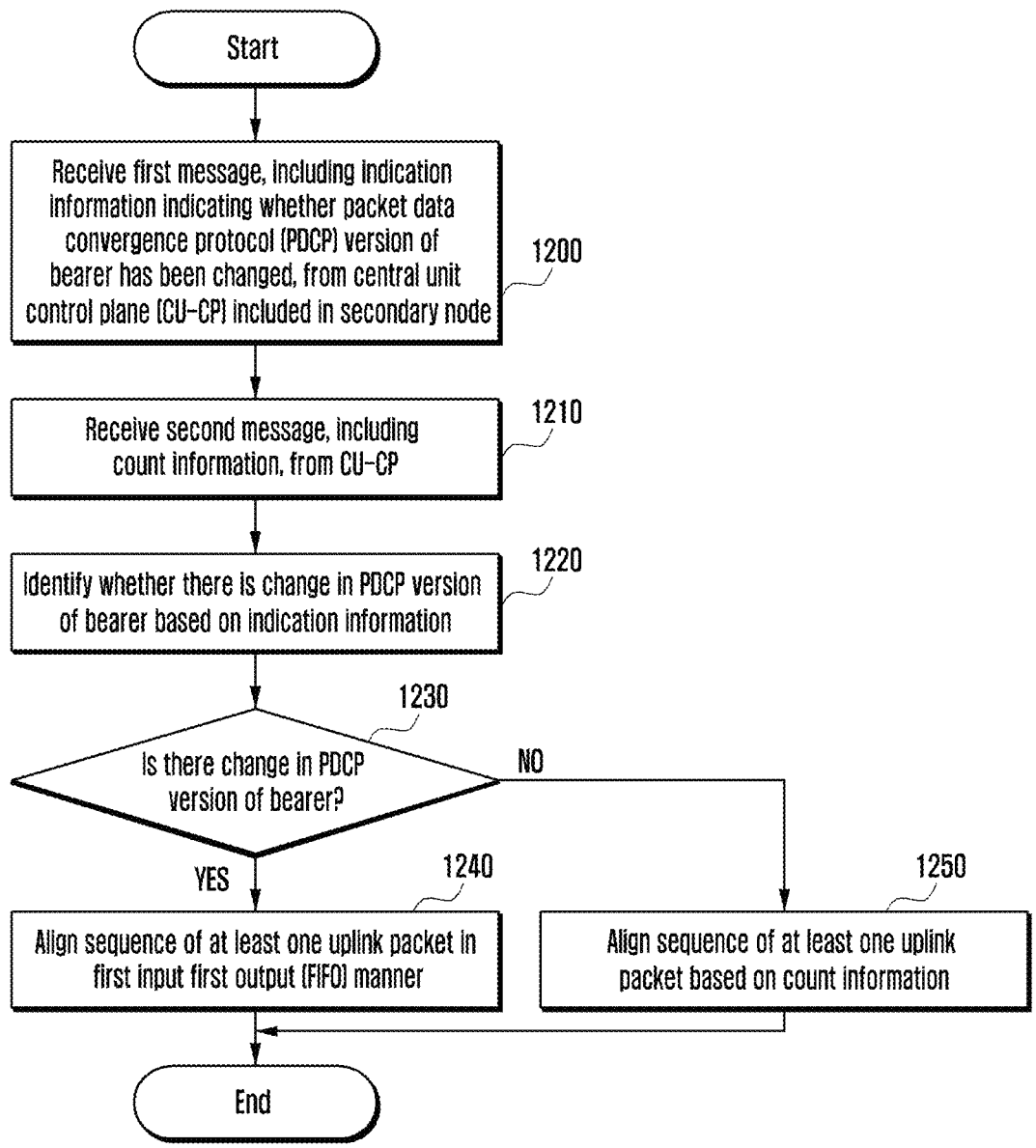
FIG. 12 is a flowchart showing an operation of various examples in which a CU-UP included in a secondary node aligns sequences of UL packets based on indication information indicating whether a PDCP version has been changed according to various embodiments of the disclosure.

FIG. 11 is a flowchart showing an operation of various examples in which a CU-UP included in a SgNB aligns sequences of UL packets based on indication information indicating whether a PDCP version has been changed according to various embodiments of the disclosure. FIG. 12 is a flowchart showing an operation of various examples in which a CU-UP included in a SgNB aligns sequences of UL packets based on indication information indicating whether a PDCP version has been changed according to various embodiments of the disclosure.

Operations 1100 to 1120 correspond to operations 900 and 910 of FIG. 9.

At operation 1120, the CP-UP may align the sequence of at least one UL packet received through the bearer based on at least one of the indication information received at operation 1100 or the count information received at operation 1110.

The at least one UL packet according to various embodiments of the disclosure may include at least one UL packet data-forwarded from a MeNB and at least one UL packet received from a UE.

For example, the PDCP sequence number of the at least one UL packet received from the UE may be allocated in the UE.

In this case, the UE may allocate the PDCP sequence number to the at least one UL packet, and may forward the at least one UL packet to which the PDCP sequence number has been allocated to a SgNB.

In this case, the CU-UP of the SgNB may align the sequences of the at least one UL packet to which the PDCP sequence number received from the UE has been allocated and the at least one UL packet data-forwarded from the MeNB. The CU-UP according to various embodiments of the disclosure may identify whether there is a change in the PDCP version of a bearer based on indication information. If it is identified that there is a change in the PDCP version of the bearer, the CU-UP may align the sequence of at least one UL packet using a first input first output (FIFO) scheme. If it is identified that there is no change in the PDCP version of the bearer, the CU-UP may align the sequence of at least one UL packet based on count information.

This is described specifically with reference to FIG. 12.

Operations 1200 to 1230 correspond to operations 1000 to 1030 of FIG. 10.

If it is identified that there is a change in the PDCP version of the bearer at operation 1230, the CU-UP may align the sequence of at least one UL packet using the FIFO scheme at operation 1240. This is described specifically with reference to FIG. 16. For example, the at least one UL packet may include at least one UL packet to which a PDCP sequence number received from a UE has been allocated and at least one UL packet data-forwarded from a MeNB.

As described above in FIG. 7B, if there is a change in the PDCP version of the bearer according to various embodiments of the disclosure, the UE may receive information on a PDCP version change through a RRC connection reconfiguration (RRC Connection Reconfiguration) message from a MeNB, may reset a PDCP based on the received information on a PDCP version change, and may initialize the PDCP sequence number of an UL packet to "0."

That is, the UE may initialize the PDCP sequence number to "0", and may allocate the PDCP sequence number to at least one UL packet. The CU-UP included in the SgNB may receive the at least one UL packet to which the PDCP sequence has been allocated from the UE.

If there is a change in the PDCP version of a bearer according to various embodiments of the disclosure, at least one UL packet aligned using the FIFO scheme in the CP-UP may be transmitted to a core network. In this case, a plurality of UL packets aligned using the FIFO scheme in the CP-UP may be aligned based on a PDCP sequence number in the transmission control protocol (TCP) layer of the core network.

At operation 1220, the CU-UP may identify whether there is a change in the PDCP version of the bearer based on the indication information received at operation 1000.

If it is identified that there is no change in the PDCP version of the bearer at operation 1230, at operation 1250, the CU-UP may align the sequence of at least one UL packet based on the count information received at operation 1210.

For example, the at least one UL packet may include at least one UL packet data-forwarded from a MeNB and at least one UL packet received from a UE.

Figure 15:
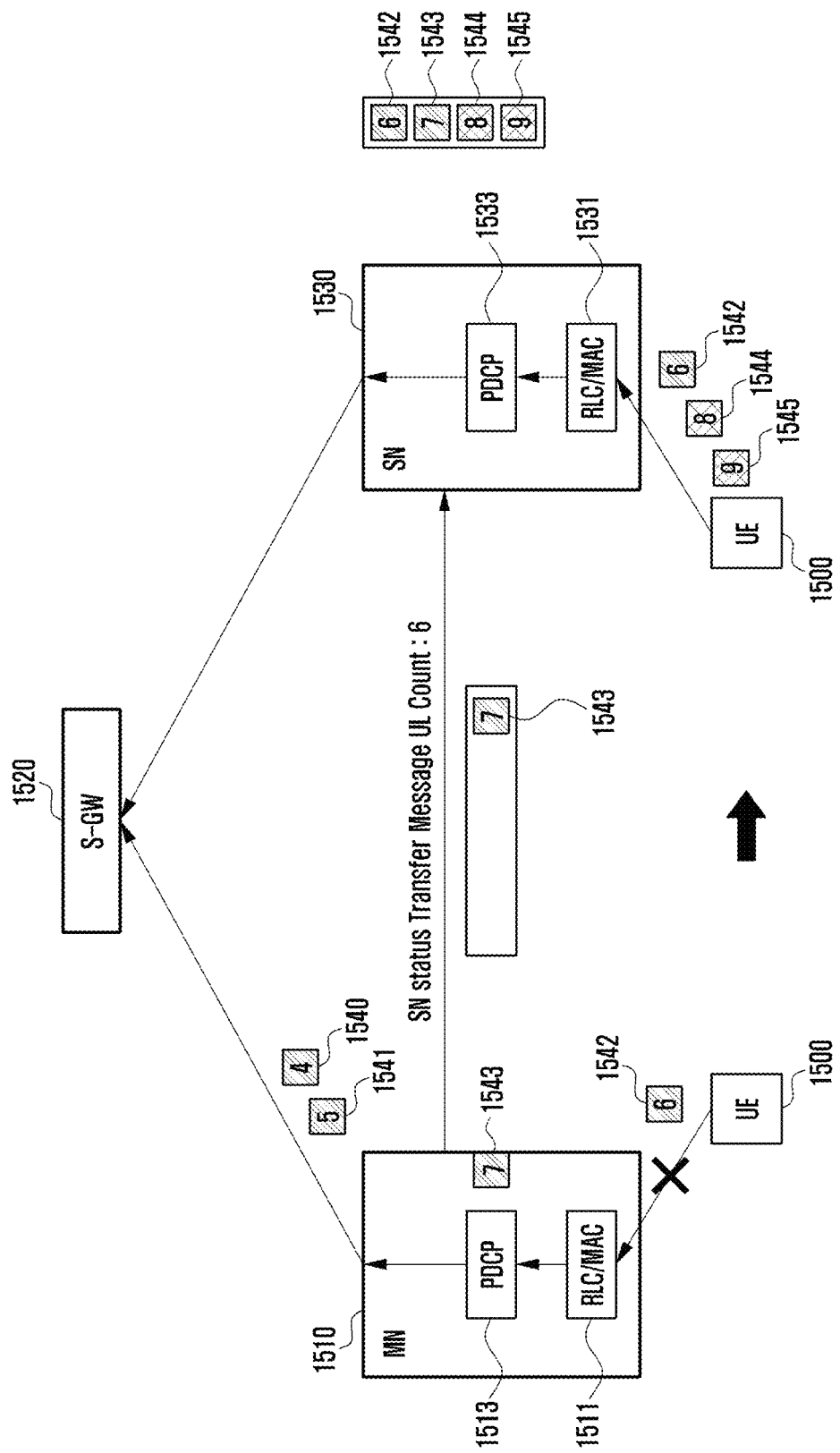
FIG. 15 is a diagram showing various examples in which a CU-UP included in a secondary node aligns sequences of UL packets based on indication information indicating whether a PDCP version has been changed according to various embodiments of the disclosure.

This is described specifically with reference to FIG. 15.

As shown in FIGS. 13 to 16, one PDCP entity is present per radio bearer (hereinafter abbreviated as an "RB"). One PDCP entity may be connected to one RLC entity.

A PDCP entity according to various embodiments may be connected to all of an acknowledged mode (AM) (acknowledgement mode, a mode in which whether data has been transmitted is checked), an unacknowledged mode (UM) (unacknowledgement mode, a mode in which whether data has been transmitted is not checked), and a transparent mode (TM) (a mode in which data is simply transmitted), that is, the three entities of RLC.

That is, each RLC entity may operate in the transparent mode (TM), the unacknowledged mode (UM) or the acknowledged mode (AM) based on the processing and transmission method of an RLC SDU. In the case of the RLC acknowledged mode (AM), an RLC PDU may be configured using the split/connection function of an RLC SDU, and may be retransmitted when the transmission of a packet fails.

FIG. 13 is a diagram showing various examples in which a CU-UP included in a secondary node allocates a PDCP sequence number to a DL packet based on indication information indicating whether a PDCP version has been changed according to various embodiments of the disclosure. FIG. 14 is a diagram showing various examples in which a CU-UP included in a secondary node allocates a PDCP sequence number to a DL packet based on indication information indicating whether a PDCP version has been changed according to various embodiments of the disclosure.

FIG. 13 is a diagram showing an example in which a PCDP sequence number is allocated to a DL packet if a target eNB using an NR PDCP allocates a radio resource for a bearer using an NR PDCP, that is, if there is no change in the PDCP version of a bearer, in a wireless communication system supporting EN-DC.

That is, a PDCP 1311 included in a source eNB 1310 shown in FIG. 13 supports an NR PDCP, RLC 1313 is E-UTRA RLC, a PDCP 1331 included in a target eNB 1330 is an NR PDCP, and RLC 1333 is NR RLC.

If there is no PDCP version change in FIG. 13, a method for a CU-UP included in the target eNB to process a DL packet may include a case where a PDCP entity is connected to a RLC AM entity. The DL packet may be retransmitted when the transmission of the DL packet fails.

As shown in FIG. 13, in the state in which a UE has not transmitted, to the source eNB, ACK/NACK information for a packet 1340 from the source eNB, having a PDCP sequence number of 4, and a packet 1341 from the source eNB, having a PDCP sequence number of 5, the CU-CP included in the target eNB may receive a SgNB addition request message from the source eNB. The CU-CP of the target eNB may identify whether the packet data convergence protocol (PDCP) version of a bearer has been changed based on the SgNB addition request, and may transmit a bearer context setup request message, including indication information indicating whether the PDCP version has been changed, to the CU-UP of the target eNB.

Furthermore, the CU-UP of the target eNB may receive an SN status transfer message, including count information (e.g., DL count=6) indicative of the count of the first packet to be transmitted to the UE, from the CU-CP.

As described above, the CU-UP may identify that there is no change in the PDCP version of the bearer based on the indication information received from the CU-CP, and may allocate a PDCP sequence number to at least one DL packet based on 6, that is, the count information.

As shown in FIG. 13, the target eNB may receive at least one DL packet 1340, 1341, 1342, 1344, and 1345 data-forwarded from the source eNB. The data-forwarded least one DL packet may be configured with an End Maker packet as shown in FIG. 13.

In the handover completion step of a handover procedure, if a flow of traffic transmitted by an S-GW changes from a source base station (source eNB in FIG. 13) to a target base station (target eNB in FIG. 13), an "End Maker" packet may be used in order to prevent a loss of a packet or a change in the sequence of packets during the process. When the target eNB receives the "End Maker" packet, it may receive least one DL packet 1346, 1347, 1348, that is, a new packet, from the S-GW.

As shown in FIG. 13, in the PDCP layer of the target eNB, PDCP sequence numbers "4" and "5" have already been allocated to DL packets 1340 and 1341 that belong to the data-forwarded at least one DL packet and that is retransmitted in the PDCP of the source eNB. Accordingly, the PDCP sequence numbers of packets 1342, 1343, 1344, 1345, 1346, 1347, and 1348 to which a PDCP sequence number has not been allocated may be allocated "6", that is, count information included in the SN status transfer message.

Accordingly, as shown in FIG. 13, PDCP sequence numbers from "6" to "12" may be allocated to the at least one DL packet 1342, 1343, 1344, and 1345, that is, data-forwarded packets, and at least one DL packet 1346, 1347, and 1348, that is new packets received from the S-GW by the PDCP layer of the target eNB.

FIG. 14 is a diagram showing an example in which a PDCP sequence number is allocated to a DL packet if a secondary node using an NR PDCP allocates a radio resource for a bearer using an LTE PDCP, that is, if there is a change in the PDCP version of a bearer, in a wireless communication system supporting EN-DC.

That is, a PDCP 1411 included in a source eNB 1410 of FIG. 14 is an LTE PDCP, RLC 1413 is E-UTRA RLC, a PDCP 1431 included in a SgNB is an NR PDCP, and RLC 1433 is NR RLC.

As shown in FIG. 14, in the state in which a UE has not transmitted, to the source eNB, ACK/NACK information for a packet 1440 having a PDCP sequence number of 4 transmitted by the source eNB and a packet 1441 having a PDCP sequence number of 5 transmitted by the source eNB, the CU-CP of the SgNB may receive a SgNB addition request message from the source eNB. The CU-CP of the SgNB may identify whether the PDCP version of a bearer has been changed based on the SgNB addition request, and may transmit a bearer context setup request message, including indication information indicating whether the PDCP version has been changed, to the CU-UP of the SgNB.

Furthermore, the CU-UP of the SgNB may receive an SN status transfer message, including count information (e.g., DL count=6) indicative of the count of the first packet to be transmitted to the UE, from the CU-CP.

As shown in FIG. 14, the type of bearer has changed from an LTE PDCP version to an NR PDCP version. Accordingly, the source eNB may reset current configuration information of the UE through an RRC connection reconfiguration message, and may transmit information (e.g., full configuration) indicative of a configuration as new configuration information. Accordingly the UE may receive the information on the PDCP version change from the source eNB through the RRC connection reconfiguration message, may reset a PDCP based on the received information on a PDCP version change, and may initialize the PDCP sequence number of a DL packet to "0."

As shown in FIG. 14, the target eNB may receive at least one DL packet 1440, 1441, 1442, 1444, and 1445 data-forwarded from the source eNB. The data-forwarded least one DL packet may be configured with an End Maker packet as shown in FIG. 14.

In the handover completion step of a handover procedure, if a flow of traffic transmitted by an S-GW changes from a source base station (source eNB in FIG. 14) to a target base station (target eNB in FIG. 14), an "End Maker" packet may be used in order to prevent a loss of a packet or a change in the sequence of packets during the process. When the target eNB receives the "End Maker" packet, it may receive least one DL packet 1446, 1447, 1448, that is, a new packet, from the S-GW.

Furthermore, as shown in FIG. 14, the type of bearer has changed from an LTE PDCP version to an NR PDCP version. Accordingly, the CU-UP may initialize a PDCP sequence number without taking into consideration count information included in the SN status transfer message, and may allocate a PDCP sequence number to at least one DL packet.

For example, initializing the PDCP sequence number may include allocating a PDCP sequence number 0 to the first DL packet transmitted to the UE and then performing PDCP sequence numbering.

At least one DL packet according to various embodiments of the disclosure may include at least one DL packet data-forwarded from a source eNB and at least one DL packet, that is, a new packet received from a core network (e.g., 4G core network in the EN-DC system).

For example, the first DL packet transmitted from the SgNB to the UE may be the first DL packet data-forwarded from the source eNB.

As shown in FIG. 14, the CU-UP included in the SgNB may allocate a PDCP sequence number 0 to the first DL packet 1440 that is the first DL packet transmitted to the UE and that is data-forwarded from the source eNB.

Accordingly, as shown in FIG. 14, PDCP sequence numbers from "0" to "8" may be sequentially allocated to DL packets 1440, 1441, 1442, 1443, 1444, and 1445 data-forwarded, including retransmitted DL packets, and DL packets 1446, 1447, and 1448, that is, new packets transmitted by a S-GW.

That is, according to an algorithm shown in FIG. 15 according to various embodiments of the disclosure, a loss of data can be prevented because PDCP sequence number setting between a UE and the CU-UP of a SgNB is the same.

Figure 16:
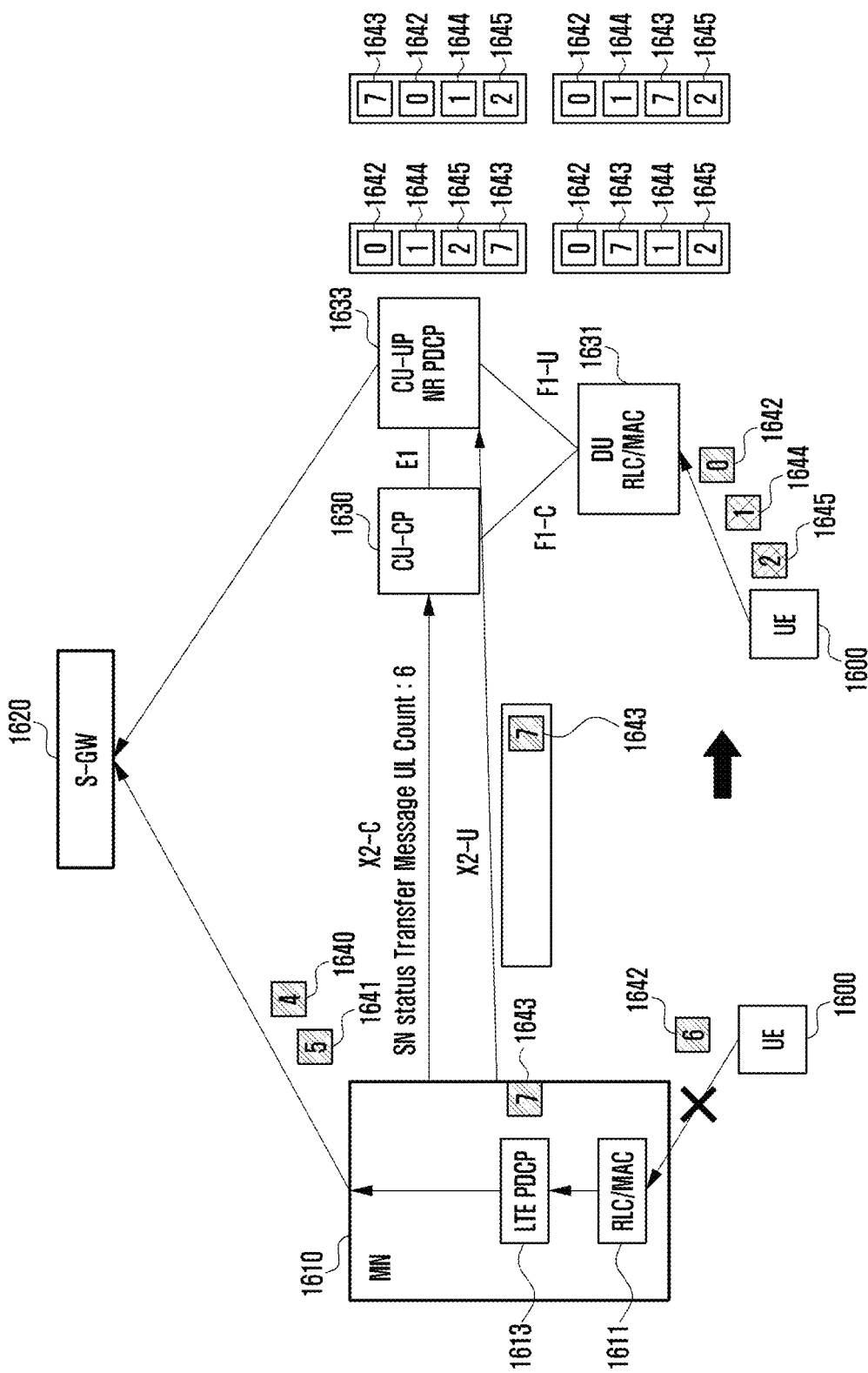
FIG. 16 is a diagram showing various examples in which a CU-UP included in a secondary node aligns sequences of UL packets based on indication information indicating whether a PDCP version has been changed according to various embodiments of the disclosure.

FIG. 15 is a diagram showing various examples in which a CU-UP included in a target eNB aligns sequences of UL packets based on indication information indicating whether a PDCP version has been changed according to various embodiments of the disclosure. FIG. 16 is a diagram showing various examples in which a CU-UP included in a target eNB aligns sequences of UL packets based on indication information indicating whether a PDCP version has been changed according to various embodiments of the disclosure.

FIG. 15 is a diagram showing an example in which the sequences of at least one UL packet are aligned if a target eNB using an NR PDCP allocates a radio resource for a bearer using an NR PDCP in a wireless communication system supporting EN-DC, that is, if there is a change in the PDCP version of the bearer.

That is, a PDCP 1513 included in a source eNB 1510 of FIG. 15 supports an NR PDCP, RLC 1511 is E-UTRA RLC, a PDCP 1533 included in a target eNB 1530 is an NR PDCP, and RLC 1531 is NR RLC.

As shown in FIG. 15, a UE may transmit at least one UL packet 1540, 1541, 1542, and 1543 to the source eNB. In the state in which the UE has not received ACK/NACK information for the UL packet 1542, transmitted to the source eNB, from the source eNB, a CU-CP included in the target eNB may receive a SgNB addition request message from the source eNB. The CU-CP may identify whether the packet PDCP version of the bearer has been changed based on the SgNB addition request, and may transmit a bearer context setup request message, including indication information indicating whether the PDCP version has been changed, to the CU-UP of the target eNB.

Furthermore, the CU-UP of the target eNB may receive an SN status transfer message, including count information (e.g., UL count=6) indicative of the count of the first UL packet to be received from the UE, from the CU-CP.

As shown in FIG. 15, the UE may retransmit, to the target eNB, the UL packet 1542 on which ACK/NACK information has not received from the source eNB. Accordingly, the UE may transmit the at least one UL packet 1542, 1544, and 1545, including the retransmitted UL packet 1542, to the CU-UP of the target eNB.

As described above, the CU-UP may identify that there is no change in the PDCP version of the bearer based on the indication information obtained from the CU-CP. As shown in FIG. 15, the CU-UP may align the sequences of the at least one UL packet 1543 data-forwarded from the source eNB and the at least one UL packet 1542, 1544, and 1545 received from the UE based on "6", that is, the count information included in the SN status transfer message.

FIG. 16 is a diagram showing an example in which the sequences of at least one UL packet are aligned if a target eNB using an NR PDCP allocates a radio resource for a bearer using an LTE PDCP in a wireless communication system supporting EN-DC, that is, if there is a change in the PDCP version of the bearer.

That is, a PDCP 1613 included in a source eNB 1610 of FIG. 16 is an LTE PDCP, RLC 1611 is E-UTRA RLC, a PDCP 1633 included in a target eNB is an NR PDCP, and RLC 1631 is NR RLC.

As shown in FIG. 16, a UE may transmit at least one UL packet 1640, 1641, 1642, and 1643 to the source eNB. In the state in which the UE has not received ACK/NACK information for the UL packet 1642, transmitted to the source eNB, from the source eNB, a CU-CP included in the target eNB may receive a SgNB addition request message from the source eNB. The CU-CP may identify whether the PDCP version of the bearer has been changed based on the SgNB addition request, and may transmit a bearer context setup request message, including indication information indicating whether the PDCP version has been changed, to the CU-UP of the target eNB.

Furthermore, the CU-UP of the target eNB may receive an SN status transfer message, including information (e.g., UL count=6) indicative of the count of the first UL packet to be received from the UE, from the CU-CP.

As shown in FIG. 16, the UE may retransmit the UL packet 1642 on which ACK/NACK information has not received from the source eNB to the target eNB. Accordingly, the UE may transmit the at least one UL packet 1642, 1644, and 1645, including the retransmitted UL packet 1642, to the CU-UP of the target eNB.

As shown in FIG. 16, the type of bearer has changed from an LTE PDCP version to an NR PDCP version. Accordingly, the source eNB may reset current configuration information of the UE through an RRC connection reconfiguration message, and may transmit information (e.g., full configuration) indicative of a configuration as new configuration information.

Accordingly, the UE may receive information on the PDCP version change from the source eNB through the RRC connection reconfiguration message, may reset a PDCP based on the received information on the PDCP version change, and may initialize the PDCP sequence number of an UL packet to "0."

That is, if there is a change in the PDCP version of the bearer, the UE may initialize the PDCP sequence numbers to "0." Accordingly, as shown in FIG. 16, the UE may allocate PDCP sequence numbers "0", "1", and "2" to the at least one UL packet 1642, 1644, and 1645, and may transmit, to the CU-UP of the target eNB, the at least one UL packet 1642, 1644, and 1645 to which the PDCP sequence numbers have been allocated.

Furthermore, as shown in FIG. 16, the type of bearer has changed from an LTE PDCP version to an NR PDCP version. Accordingly, the CU-UP may align the sequences of the at least one UL packet 1642, 1644, and 1645, received from the UE, and at least one UL packet 1643, data-forwarded from the source eNB, using the FIFO scheme without taking into consideration the count information included in the SN status transfer message.

As shown in FIG. 16, examples of the sequences of the at least one UL packet aligned using the FIFO scheme may be various.

In this case, the at least one UL packet aligned using the FIFO scheme may be transmitted to a core network. The PDCP sequence number of the at least one UL packet aligned using the FIFO scheme may be aligned in the TCP layer of the core network.

That is, according to the algorithm shown in FIG. 16 according to various embodiments of the disclosure, a loss of data can be prevented because PDCP sequence number setting between a UE and the CU-UP of a target eNB is the same.

Figure 17:
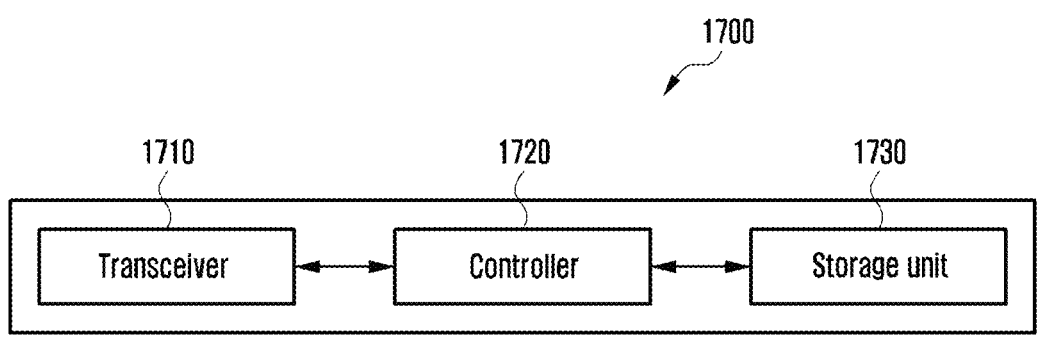
FIG. 17 is a block diagram illustrating a CU-CP included in a secondary node according to an embodiment of the disclosure.

FIG. 17 is a block diagram of a CU-CP included in a SgNB according to an embodiment of the disclosure.

As shown in FIG. 17, the CU-CP according to various embodiments may include a transceiver 1710, a controller 1720, and a memory or storage unit 1730.

The elements are described below sequentially.

The transceiver according to various embodiments may transmit and receive signals, information or data to and from a MeNB or a CU-UP and DU, that is, external network elements included in the SgNB according to various embodiments of the disclosure.

The controller according to various embodiments may include at least one processor.

The processor according to various embodiments may control an overall operation of the CU-CP. The processor may control an overall operation of the CU-CP according to the above-described various embodiments of the disclosure.

The at least one processor according to various embodiments may control the transceiver to receive, from the MeNB, an SgNB addition request for requesting a SgNB to allocate a radio resource for a bearer.

The at least one processor according to various embodiments may control the transceiver to receive, from the MeNB, an SN status transfer message including count information.

The at least one processor according to various embodiments may control the transceiver to transmit an SN status transfer message, including count information received from the MeNB, to the CU-UP.

For example, the count information is information notifying the SgNB that it should transmit and receive packets to and from a UE from which packet, and may include information (e.g., DL Count) indicative of the count of the first DL packet to be transmitted to the UE and information (e.g., UL Count) indicative of the count of the first UL packet to be received from the UE.

The at least one processor according to various embodiments may control a bearer context setup request message, including indication information indicating whether the PDCP version of a bearer has been changed, to be transmitted to the CU-UP.

For example, the indication information indicating whether the PDCP version has been changed may be identified based on information on at least one bearer for which SgNB addition has been requested, included in a SgNB addition request message, and information on the PDCP version of the at least one bearer (e.g., information on a bearer of an NR PDCP version).

For example, the indication information indicating whether the PDCP version has been changed may be represented as 1 bit. If there is a PDCP version change for each bearer, the bit has a value of 1. If there is no PDCP version change, the bit may have a value of 0.

The memory may store data, such as a basic program, an application program, or configuration information for the operation of the CU-CP. Furthermore, the memory may include at least one storage medium of a flash memory type, a hard disk type, a multimedia card micro type), a memory of a card type (e.g., SD or XD memory), a magnetic memory, a magnetic disk, an optical disk, random access memory (RAM), a static random access memory (SRAM), a read-only memory (ROM), a programmable read-only memory (PROM), or an electrically erasable programmable read-only memory (EEPROM). Furthermore, the processor may perform various operations using various programs, content or data stored in the memory.

Figure 18:
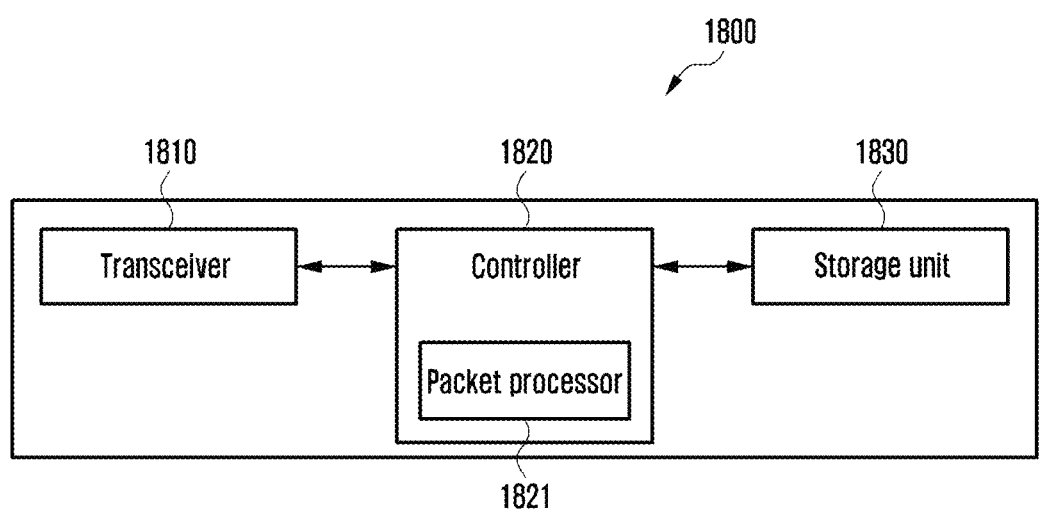
FIG. 18 is a block diagram illustrating a CU-UP included in a secondary node according to an embodiment of the disclosure.

FIG. 18 is a block diagram of a CU-UP included in a SgNB according to an embodiment of the disclosure.

As shown in FIG. 18, the CU-UP according to various embodiments may include a transceiver 1810, a controller 1820, and a memory or storage unit 1830.

The elements are described below sequentially.

The transceiver according to various embodiments may transmit and receive signals, information or data to and from a MeNB or a CU-CP and DU, that is, external network elements included in the SgNB according to various embodiments of the disclosure.

The controller according to various embodiments may include at least one processor. For example, the at least one processor 1820 may include a packet processor 1821.

The processor according to various embodiments may control an overall operation of the CU-UP. The processor may control an overall operation of the CU-UP according to the above-described various embodiments of the disclosure.

The at least one processor according to various embodiments may control the transceiver to receive a bearer context setup request message, including indication information indicating whether the PDCP version of a bearer has been changed, from the CU-CP.

The at least one processor according to various embodiments may control the transceiver to receive an SN status transfer message, including count information, from the CU-CP.

For example, the count information is information notifying the SgNB that it should transmit and receive packets to and from a UE from which packet, and may include information (e.g., DL Count) indicative of the count of the first DL packet to be transmitted to the UE and information (e.g., UL Count) indicative of the count of the first UL packet to be received from the UE.

The at least one processor according to various embodiments may allocate a PDCP sequence number to at least one DL packet, received through a bearer, based on at least one of indication information indicating whether a PDCP version has been changed, received from the CU-CP, or count information received from the CU-CP.

The at least one processor according to various embodiments may identify whether there is a change in the PDCP version of a bearer based on indication information indicating whether the PDCP version has been changed, received from the CU-CP.

For example, the information indicating whether a PDCP version has been changed may be represented as 1 bit. The bit may have a value of 1 if there is a PDCP version change for each bearer, and may have a value of 0 if there is no PDCP version change.

The at least one processor according to various embodiments may initialize a PDCP sequence number if there is a change in the PDCP version of a bearer, and may allocate a PDCP sequence number to at least one DL packet.

For example, the at least one processor according to various embodiments may allocate a PDCP sequence number 0 to the first DL packet transmitted to a UE, if there is a change in the PDCP version of a bearer. The first DL packet may be a packet data-forwarded from a MeNB.

The at least one processor according to various embodiments may allocate a PDCP sequence number to at least one DL packet based on count information, if there is no change in the PDCP version of a bearer.

The at least one processor according to various embodiments may align the sequence of at least one UL packet, received through a bearer, based on at least one of indication information, indicating whether a PDCP version has been changed, or count information received from the CU-CP.

For example, the at least one UL packet may include at least one UL packet data-forwarded from a MeNB and at least one UL packet received from a UE.

The at least one processor according to various embodiments may identify whether there is a change in the PDCP version of a bearer based on indication information indicating whether the PDCP version has been changed, received from the CU-CP. If there is a change in the PDCP version of the bearer, the at least one processor may align the sequence of at least one UL packet using the FIFO scheme. If there is no change in the PDCP version of the bearer, the at least one processor may align the sequence of the at least one UL packet based on the count information.

According to various embodiments, if there is a change in the PDCP version of a bearer, at least one UL packet aligned in the CU-UP using the FIFO scheme may be transmitted to a core network. For example, the PDCP sequence number of the at least one UL packet aligned using the FIFO scheme may be aligned in the transmission control protocol (TCP) layer of the core network.

The memory may store data, such as a basic program, an application program or configuration information for the operation of the CU-UP. Furthermore, the memory may include at least one storage medium of a flash memory type, a hard disk type, a multimedia card micro type), a memory of a card type (e.g., SD or XD memory), a magnetic memory, a magnetic disk, an optical disk, random access memory (RAM), a static random access memory (SRAM), a read-only memory (ROM), a programmable read-only memory (PROM), or an electrically erasable programmable read-only memory (EEPROM). Furthermore, the processor may perform various operations using various programs, content or data stored in the memory.

Figure 19:
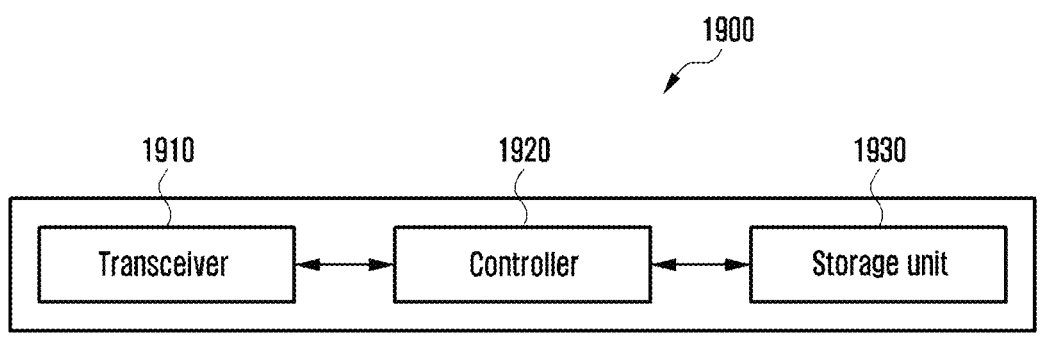
FIG. 19 is a block diagram illustrating a terminal according to an embodiment of the disclosure.

FIG. 19 is a block diagram of a UE according to an embodiment of the disclosure.

As shown in FIG. 19, the UE according to various embodiments may include a transceiver 1910, a controller 1920, and a memory or storage unit 1930.

The elements are described below sequentially.

The transceiver according to various embodiments may transmit and receive signals, information or data to and from a MeNB or a SgNB according to various embodiments of the disclosure.

The controller according to various embodiments may include at least one processor.

The processor according to various embodiments may control an overall operation of the UE. The processor may control an overall operation of the UE according to the above-described various embodiments of the disclosure.

The UE according to various embodiments is a UE supporting EN-DC. The UE is basically connected to a MeNB and may use a radio resource having a high data rate of a SgNB through a procedure, such as SgNB addition/release/modification, depending on the condition.

The at least one processor according to various embodiments may control the transceiver to transmit and receive packets to and from a MeNB and a SgNB at the same time.

The UE according to various embodiments is a UE supporting data retransmission.

The at least one processor according to various embodiments may control the transceiver to receive change configuration information (delta configuration) of a bearer, that is, the subject of data-forwarding, from a MeNB.

For example, the at least one processor according to various embodiments may control the transceiver to receive information on a PDCP version change through an RRC connection reconfiguration message from a MeNB.

In this case, the at least one processor according to various embodiments may reset a PDCP based on the received information on a PDCP version change, and may initialize the PDCP sequence number of a DL/UL packet to "0."

The memory may store data, such as a basic program, an application program or configuration information, for the operation of the UE. Furthermore, the memory may include at least one storage medium of a flash memory type, a hard disk type, a multimedia card micro type), a memory of a card type (e.g., SD or XD memory), a magnetic memory, a magnetic disk, an optical disk, random access memory (RAM), a static random access memory (SRAM), a read-only memory (ROM), a programmable read-only memory (PROM), or an electrically erasable programmable read-only memory (EEPROM). Furthermore, the processor may perform various operations using various program, content or data stored in the memory.

In the above-described detailed embodiments of the disclosure, the elements included in the disclosure may be expressed in the singular or plural form depending on the proposed detailed embodiment. However, the singular or plural expression has been selected suitably for a situation proposed for convenience of description, and the disclosure is not limited to the singular or plural elements. Although an element has been expressed in the plural form, it may be configured in the singular form. Although an element has been expressed in the singular form, it may be configured in the plural form. The embodiments described in this specification have been individually described, but two or more of the embodiments may be combined and practiced.

According to various embodiments of the disclosure, there can be provided a method and apparatus for preventing a loss of data attributable to a mismatch in the PDCP version of a bearer if a SgNB using an NR PDCP allocates a radio resource for a bearer using an LTE PDCP in a wireless communication system supporting EN-DC.

According to various embodiments of the disclosure, there can be provided a method and apparatus capable of preventing a mismatch in PDCP sequence number setting between a CU-UP included in a SgNB and a UE because a CU-CP included in a SgNB transmits a message, including indication information indicating whether the PDCP version of a bearer has been changed, to a CU-UP included in the SgNB if a MeNB makes a SgNB addition request message so that the SgNB allocates a radio resource for a bearer in a wireless communication system supporting EN-DC.

Although the detailed embodiments have been described in the detailed description of the disclosure, the disclosure may be modified in various ways without departing from the scope of the disclosure. Accordingly, the scope of the disclosure should not be limited to the above-described embodiments, but should be defined by not only the claims, but equivalents thereof.

The embodiments of the disclosure and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar elements. An expression of the singular number may include an expression of the plural number unless clearly defined otherwise in the context. In this document, an expression, such as "A or B", "at least one of A or/and B", "A, B or C" or "at least one of A, B and/or C", may include all of possible combinations of listed items together. Expressions, such as "a first," "a second," "the first" and "the second", may modify corresponding elements regardless of the sequence and/or importance, and are used to only distinguish one element from the other element and do not limit corresponding elements. When it is described that one (e.g., first) element is "(operatively or communicatively) connected to" or "coupled with" the other (e.g., second) element, one element may be directly connected to the other element or may be connected to the other element through another element (e.g., third element).

The "module" used in the disclosure includes a unit configured with hardware, software or firmware, and may be interchangeably used with a term, such as logic, a logical block, a part or a circuit. The module may be an integrated part, a minimum unit to perform one or more functions, or a part thereof. For example, the module may be configured with an application-specific integrated circuit (ASIC).

The various embodiments of the disclosure may be implemented as machine (e.g., computer)-readable storage media (e.g., software (e.g., program) including instructions stored in an internal memory or external memory). A device is an apparatus capable of fetching instructions stored in the storage media and operating according to the fetched instructions, and may include a base station or UE according to various embodiments. If the instruction is executed by the processor (e.g., the controller 1720 of FIG. 17 or the controller 1820 of FIG. 18 or the controller 1920 of FIG. 19), a function corresponding to the instruction may be directly performed by the processor or may be performed using other elements under the control of the processor. The instruction may include code generated or executed by a compiler or interpreter.

The machine-readable storage media may be provided in the form of a non-transitory storage medium. In this case, the term "non-transitory" means that the storage media do not include a signal and is tangible, and is not limited to whether data is stored in the storage media semi-permanently or temporally.

The method according to various embodiments disclosed in the disclosure may be included in a computer program product and provided. The computer program product may be traded as a product between a seller and a purchaser. The computer program product may be online distributed in the form of device-readable storage media (e.g., compact disc read only memory (CD-ROM)) or through an app store (e.g., PlayStore™) In the case of the online distribution, at least some of the computer program product may be at least temporarily stored or temporally generated in storage media, such as the memory of the server of a manufacturer, the server of an app store or a relay server.

Each of elements (e.g., module or program) according to various embodiments may be configured with a single entity or a plurality of entities. Some of the above-described sub-elements may be omitted other sub-elements may be further included in various embodiments. Alternatively or additionally, some elements (e.g., modules or programs) may be integrated into one entity, and may perform a function, performed by each corresponding element prior to the integration, identically or similarly. Operations performed by a module, a program or other elements according to various embodiments may be executed sequentially, in parallel, repeatedly, or heuristically, or at least some operations may be executed in different order or may be omitted, or other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a central unit-control plane (CU-CP) included in a secondary node (SN) or secondary gNB (SgNB) in a wireless communication system supporting evolved universal terrestrial radio access and new radio dual connectivity (EN-DC), the method comprising:
   receiving, from a master node (MN) or master eNB (MeNB), a first message for requesting the SgNB to allocate a radio resource for a bearer;
   transmitting, to a central unit-user plane (CU-UP) included in the SgNB, a second message, including indication information indicating whether a packet data convergence protocol (PDCP) version of the bearer has been changed; and
   transmitting, to the CU-UP, a third message including count information on a PDCP sequence number (SN) for a packet received through the bearer,
   wherein the indication information is generated based on the first message, and
   wherein the packet received through the bearer is aligned at the CU-UP based on at least one of the indication information or the count information.

2. The method of claim 1,
   wherein the first message includes a SgNB addition request message,
   wherein the second message includes a bearer context setup request message, and
   wherein the third message includes an SN status transfer message.

3. The method of claim 1, wherein a size of the indication information is 1 bit.

4. The method of claim 1, wherein whether the PDCP version has been changed is identified based on information on at least one bearer for which SgNB addition has been requested, included in the first message, and information on a PDCP version of the at least one bearer.

5. The method of claim 1,
   wherein, in case that the packet is a downlink packet, a PDCP SN for the downlink packet is allocated at the CU-UP based on at least one of the indication information or the count information, and
   wherein, in case that the packet is an uplink packet, the uplink packet is aligned further based on a first input first output (FIFO) scheme.

6. A central unit-control plane (CU-CP) included in a secondary node (SN) or secondary gNB (SgNB) in a wireless communication system supporting evolved universal terrestrial radio access and new radio dual connectivity (EN-DC), the CU-CP comprising:
   a transceiver; and a processor configured to:
receive, from a master node (MN) or master eNB (MeNB), a first message for requesting the SgNB to allocate a radio resource for a bearer,
transmit, to a central unit-user plane (CU-UP) included in the SgNB, a second message, including indication information indicating whether a packet data convergence protocol (PDCP) version of the bearer has been changed; and
transmit, to the CU-UP, a third message including count information on a PDCP sequence number (SN) for a packet received through the bearer,
wherein the indication information is generated based on the first message, and
wherein the packet received through the bearer is aligned at the CU-UP based on at least one of the indication information or the count information.

7. The CU-CP of claim 6, wherein the processor is configured to identify whether the PDCP version has been changed based on information on at least one bearer for which SgNB addition has been requested, included in the first message, and information on a PDCP version of the at least one bearer.

8. The CU-CP of claim 6,
wherein the first message includes a SgNB addition request message,
wherein the second message includes a bearer context setup request message, and
wherein the third message includes an SN status transfer message.

9. The CU-CP of claim 6,
wherein a size of the indication information is 1 bit.

10. The CU-CP of claim 6,
wherein, in case that the packet is a downlink packet, a PDCP SN for the downlink packet is allocated at the CU-UP based on at least one of the indication information or the count information, and
wherein, in case that the packet is an uplink packet, the uplink packet is aligned further based on a first input first output (FIFO) scheme.

11. A method of a central unit-user plane (CU-UP) included in a secondary node (SN) or secondary gNB (SgNB) in a wireless communication system supporting evolved universal terrestrial radio access and new radio dual connectivity (EN-DC), the method comprising:
receiving, from a central unit-control plane (CU-CP) included in the SgNB, a second message including indication information indicating whether a packet data convergence protocol (PDCP) version of a bearer has been changed;
receiving, from the CU-CP, a third message including count information on a PDCP sequence number (SN) for a packet received through the bearer; and
aligning the packet received through the bearer based on at least one of the indication information or the count information, wherein the indication information is generated based on a first message requesting the SgNB to allocate a radio resource for the bearer, the first message being received from a master node (MN) or master eNB (MeNB).

12. The method of claim 11,
wherein the first message includes a SgNB addition request message,
wherein the second message includes a bearer context setup request message, and
wherein the third message includes an SN status transfer message.

13. The method of claim 11, wherein a size of the indication information is 1 bit.

14. The method of claim 11, wherein whether the PDCP version has been changed is identified based on information on at least one bearer for which SgNB addition has been requested, included in the first message, and information on a PDCP version of the at least one bearer.

15. The method of claim 11, further comprising:
in case that the packet is a downlink packet, allocating a PDCP SN for the downlink packet based on at least one of the indication information or the count information; and
in case that the packet is an uplink packet, aligning the uplink packet further based on a first input first output (FIFO) scheme.

16. A central unit-user plane (CU-UP) included in a secondary node (SN) or secondary gNB (SgNB) in a wireless communication system supporting evolved universal terrestrial radio access and new radio dual connectivity (EN-DC), the CU-UP comprising:
a transceiver; and
a processor configured to:
receive, from a central unit-control plane (CU-CP) included in the SgNB, a second message including indication information indicating whether a packet data convergence protocol (PDCP) version of a bearer has been changed,
receive, from the CU-CP, a third message including count information on a PDCP sequence number (SN) for a packet received through the bearer, and
align the packet received through the bearer based on at least one of the indication information or the count information,
wherein the indication information is generated based on a first message requesting the SgNB to allocate a radio resource for the bearer, the first message being received from a master node (MN) or master eNB (MeNB).

17. The CU-UP of claim 16,
wherein the first message includes a SgNB addition request message,
wherein the second message includes a bearer context setup request message, and
wherein the third message includes an SN status transfer message.

18. The CU-UP of claim 16, wherein a size of the indication information is 1 bit.

19. The CU-UP of claim 16, wherein whether the PDCP version has been changed is identified based on information on at least one bearer for which SgNB addition has been requested, included in the first message, and information on a PDCP version of the at least one bearer.

20. The CU-UP of claim 16, wherein the processor is further configured to:
in case that the packet is a downlink packet, allocate a PDCP SN for the downlink packet based on at least one of the indication information or the count information, and
in case that the packet is an uplink packet, align the uplink packet further based on a first input first output (FIFO) scheme.

* * * * *